US011005678B2

(12) United States Patent
Madden et al.

(10) Patent No.: US 11,005,678 B2
(45) Date of Patent: May 11, 2021

(54) MACHINE LEARNING FOR HOME UNDERSTANDING AND NOTIFICATION

(71) Applicant: Alarm.com Incorporated, Tysons, VA (US)

(72) Inventors: Donald Madden, Columbia, MD (US); Allison Beach, Leesburg, VA (US); Jennifer Doughty, Sterling, VA (US)

(73) Assignee: Alarm.com Incorporated, Tysons, VA (US)

( * ) Notice: Subject to any disclaimer, the term of this patent is extended or adjusted under 35 U.S.C. 154(b) by 140 days.

(21) Appl. No.: 16/416,868

(22) Filed: May 20, 2019

(65) Prior Publication Data

US 2019/0356505 A1 Nov. 21, 2019

Related U.S. Application Data

(60) Provisional application No. 62/673,548, filed on May 18, 2018.

(51) Int. Cl.
*H04L 12/28* (2006.01)
*G06N 20/00* (2019.01)

(52) U.S. Cl.
CPC ......... *H04L 12/2829* (2013.01); *G06N 20/00* (2019.01); *H04L 12/282* (2013.01); *H04L 12/2812* (2013.01); *H04L 12/2814* (2013.01); *H04L 12/2834* (2013.01)

(58) Field of Classification Search
CPC ............. H04L 12/2829; H04L 12/2834; H04L 12/2812; H04L 12/2814; H04L 12/282; G06N 20/00; G06N 5/022; G06N 3/08
See application file for complete search history.

(56) References Cited

U.S. PATENT DOCUMENTS

| 8,516,514 | B2 | 8/2013 | Belz et al. |
| 9,878,206 | B2 | 1/2018 | Rowe |
| 10,051,415 | B1* | 8/2018 | Lalka ...................... H04W 4/02 |
| 1,067,388 | A1 | 6/2020 | Pratt et al. |
| 1,075,510 | A1 | 8/2020 | Bakry et al. |
| 10,755,106 | B1* | 8/2020 | Bakry ............... G06K 9/00771 |
| 10,802,839 | B2* | 10/2020 | Movsisyan ............ G06F 9/451 |
| 2005/0237179 | A1 | 10/2005 | Cuddihy et al. |

(Continued)

OTHER PUBLICATIONS

PCT Invitation to Pay Fees in International Application No. PCT/US2019/033058, dated Jul. 18, 2019, 2 pages.

(Continued)

*Primary Examiner* — Ming Y Hon
(74) *Attorney, Agent, or Firm* — Fish & Richardson P.C.

(57) ABSTRACT

Methods, systems, and apparatus, including computer programs encoded on a computer storage medium, for machine learning for home understanding and notification. In one aspect, a method includes obtaining reference videos from a camera within a premises of a home, determining, from the reference videos, timing of actions in a routine that a particular person performs before leaving the home, determining from a sample video from the camera within the home that the particular person appears to be out of sync in performing a particular action based on the timing of actions in the routine determined from the reference videos, and in response, providing a notification to the particular person.

22 Claims, 11 Drawing Sheets

(56) References Cited

U.S. PATENT DOCUMENTS

| | | | |
|---|---|---|---|
| 2006/0106846 A1* | 5/2006 | Schulz | G06Q 10/10 |
| 2009/0006286 A1* | 1/2009 | Angell | G06Q 30/0255 |
| | | | 706/12 |
| 2009/0292677 A1* | 11/2009 | Kim | G06F 16/958 |
| 2010/0106603 A1* | 4/2010 | Dey | G01C 21/3617 |
| | | | 705/14.63 |
| 2011/0295583 A1 | 12/2011 | Hollock et al. | |
| 2012/0084248 A1* | 4/2012 | Gavrilescu | G06F 16/9535 |
| | | | 706/52 |
| 2012/0143378 A1* | 6/2012 | Spears | H04L 67/125 |
| | | | 700/275 |
| 2014/0266791 A1* | 9/2014 | Lloyd | G08B 21/0423 |
| | | | 340/870.09 |
| 2015/0241860 A1* | 8/2015 | Raid | H05B 47/105 |
| | | | 700/275 |
| 2015/0341599 A1 | 11/2015 | Carey | |
| 2017/0160319 A1 | 6/2017 | Dibb | |
| 2018/0075721 A1 | 3/2018 | Oliver et al. | |
| 2018/0129742 A1 | 5/2018 | Li et al. | |
| 2018/0338031 A1 | 11/2018 | Subramanian et al. | |
| 2018/0357870 A1* | 12/2018 | Siminoff | G08B 13/19671 |
| 2019/0080157 A1* | 3/2019 | Lev | G06T 7/20 |
| 2019/0122522 A1* | 4/2019 | Stefanski | G08B 13/19613 |
| 2019/0261599 A1 | 8/2019 | Bedell et al. | |
| 2019/0318283 A1* | 10/2019 | Kelly | G06N 20/00 |

OTHER PUBLICATIONS

PCT International Search Report and Written Opinion in International Application No. PCT/US2019/033058, dated Sep. 10, 2019, 14 pages.

PCT International Preliminary Report on Patentability in International Application No. PCT/US2019/033058, dated Dec. 3, 2020, 11 pages.

* cited by examiner

MACHINE LEARNING FOR HOME UNDERSTANDING AND NOTIFICATION

CROSS-REFERENCE TO RELATED APPLICATIONS

This application claims the benefit under 35 U.S.C. § 119(e) of U.S. Patent Application No. 62/673,548, entitled "Machine Learning for Home Understanding and Notification" filed May 18, 2018, which is incorporated herein by reference in its entirety.

TECHNICAL FIELD

This disclosure application relates generally to monitoring systems, and more particularly, to improved home understanding and notifications.

BACKGROUND

Home monitoring systems can include various security hardware devices installed on a property for tracking activity on the property, where anomalies can be detected and reported to a user.

SUMMARY

Techniques are described for monitoring technology for improving home understanding and notifications.

In general, one innovative aspect of the subject matter described in this specification can be embodied in methods that include the actions of obtaining reference videos from a camera within a premises of a home, determining, from the reference videos, timing of actions in a routine that a particular person performs before leaving the home, determining from a sample video from the camera within the home that the particular person appears to be out of sync in performing a particular action based on the timing of actions in the routine determined from the reference videos, and in response, providing a notification to the particular person. Other embodiments of this aspect include corresponding systems, apparatus, and computer programs, configured to perform the actions of the methods, encoded on computer storage devices.

These and other embodiments can each optionally include one or more of the following features. In some implementations, determining the timing of actions in the routine performed by the particular person before leaving the home includes performing cluster analysis on various instances of the actions within the reference videos. The timing of actions in the routine can be determined by one or more of a frequency of detected actions in the reference videos, a user-defined significance of actions in the reference videos, and a strength of a pattern of actions in the reference videos.

In some implementations, the routine performed by the particular person is a geo-path of the particular person through an area within the home. The routine performed by the particular person can include multiple sub-routines, where each sub-routine of the multiple sub-routines includes an associated time frame and duration during which the sub-routine is completed.

In some implementations, the methods further include receiving, from a user, a user-defined routine including one or more sub-routines, wherein the user-defined routine includes prioritization for the one or more sub-routines.

In some implementations, the notification responsive to the particular person appearing to be out of sync in performing a particular action based on the timing of actions in the routine includes an alert to the particular person of the particular person's status relative to the routine. The notification can include a visual cue to the particular person of the particular person's status relative to the routine.

In some implementations, generating the notifications further includes determining a measure of the particular person's status relative to the routine.

In another embodiment, one innovative aspect of the subject matter described in this specification can be embodied in methods that include the actions of collecting activity data from one or more devices in a home network, generating a graph-based knowledge base including two or more nodes based on the activity data, where each node is an object, person, or routine and wherein each link is a relationship between two nodes, generating, based on the graph-based knowledge base, one or more rules, determining, based on the activity data, an occurrence of a particular rule of the one or more rules, generating a notification responsive to the particular rule, presenting the notification to a user, receiving, from the user, user feedback responsive to the notification, where the user feedback includes a natural language label for the particular rule, and updating the particular rule based on the user feedback. Other embodiments of this aspect include corresponding systems, apparatus, and computer programs, configured to perform the actions of the methods, encoded on computer storage devices.

These and other embodiments can each optionally include one or more of the following features. In some implementations, the graph-based knowledge base includes one or more sub-graphs, where each sub-graph defines a relationship between at least two or more nodes. A rule of the one or more rules can be generated based on observations of a particular sub-graph of the one or more sub-graphs of the graph-based knowledge graph.

In some implementations, the methods further include receiving, from a user, a user-defined rule, where the user-defined rule includes one or more elements from the graph-based knowledge base. Categories of objects or people and instances of events can be represented as nodes and relationships between the categories and instances of events can be represented as links between the nodes.

In some implementations, user-provided attributes can be assigned to each of the one or more nodes. User feedback can include a natural language label for a particular node of the graph-based knowledge base, and/or a natural language label for a particular link between at least two nodes of the graph-based knowledge base.

In some implementations, generating the graph-based knowledge base includes determining, based on the one or more site specific models, two or more nodes, and determining, based on activity data, a relationship between the two or more nodes.

In some implementations, the methods further include receiving from a user a natural language graph-based query to the graph-based knowledge base, determining, based on the one or more terms of the natural language graph based query, one or more nodes referenced by the query, and providing to the user activity data related to the one or more nodes of the graph-based knowledge base.

In another embodiment, one innovative aspect of the subject matter described in this specification can be embodied in methods that include the actions of obtaining reference videos from a camera within a home, determining from the reference videos that a particular person routinely leaves the home with a particular object at a particular time of day, determining from a sample video from the camera within the home that the particular person appears to be leaving the home without the particular object at the particular time of day, and in response, providing a notification regarding the particular object. Other embodiments of this aspect include corresponding systems, apparatus, and computer programs, configured to perform the actions of the methods, encoded on computer storage devices.

These and other embodiments can each optionally include one or more of the following features. In some implementations, user-provided activity data is provided by the particular person for the particular object. The user-provided activity data can include one or more of video data, image data, three-dimensional model data for the particular object.

In some implementations, determining from the sample video from the camera within the home that the particular person appears to be leaving the home without the particular object at the particular time of day includes analyzing the sample video utilizing one or more site-specific models for the particular object and the particular person.

In some implementations, providing the notification regarding the particular object includes providing the notification to a user device of a user.

In some implementations, the methods further include receiving from the user and responsive to the notification, user feedback including user-based labeling, where the user-based labeling includes one or more shared labels for the particular object. The one or more shared labels can define a relationship between two or more particular objects.

In some implementations, the methods further include receiving, from a user, a natural language query referencing the particular object, the natural language query including one or more terms, determining that objects appearing in reference videos are similar to a site-specific model of the particular object, and providing, to the user, a subset of reference videos including the particular object.

In some implementations, a site-specific human model is trained for the particular person using one or more of soft biometrics and facial recognition software analysis of the reference videos. Reference videos can be, for example, imaging data, audio data, or a combination thereof.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for using a neural network and/or other analytics software to collect activity data of people and objects as they are arriving, leaving, or moving within a home environment, detect patterns, and generate rules dictating relationships between items, people, and routines. Notifications based on the rules (e.g., responsive to detecting an anomaly, responsive to determining a rule is being executed) can be generated and provided to a user. For example, notifications can be generated and provided to a user when the user is determined to be running late (e.g., in a morning routine) or if the user is determined to be forgetting an item of interest (e.g., a mobile phone, a backpack) as they are entering or exiting a home. User feedback received responsive to a notification and user-assisted natural language labeling can be used to inform an importance of one or more rules and further refine the one or more rules.

Example Operating Environment

Figure 1:
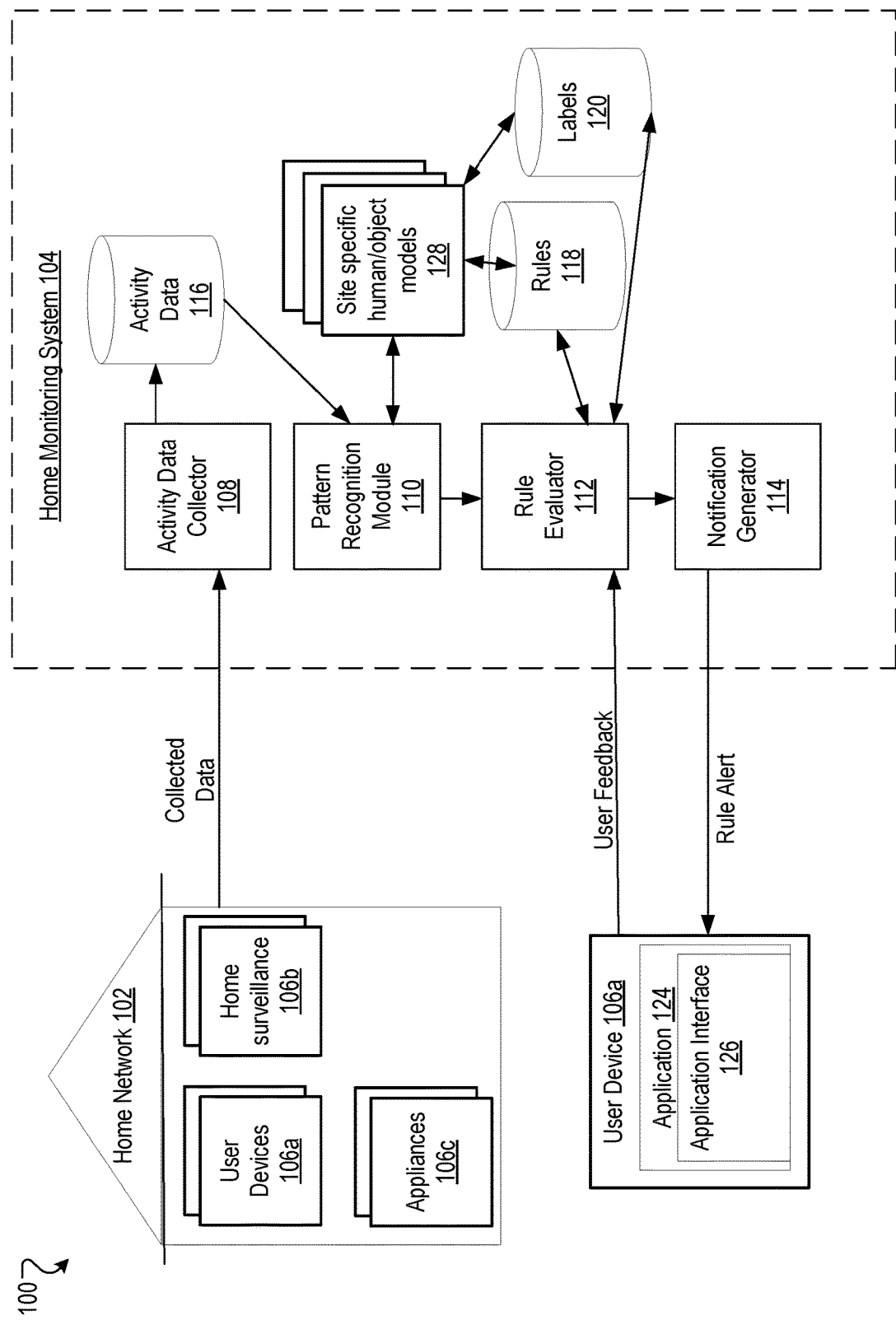
FIG. 1 is an example operating environment for a home network including a home monitoring system that provides notifications.

FIG. 1 is an example operating environment 100 for a home network 102 including a home monitoring system 104 that provides notifications. Home network 102 is configured to enable exchange of electronic communication between devices connected to the home network 102. For example, the home network 102 may be configured to enable exchange of electronic communications between home monitoring system 104, and one or more devices including user devices 106a (e.g., mobile phones, tablets, computers, "smart" watches), home surveillance devices 106b (e.g., cameras, sensors, motion detectors), and appliances 106c (e.g., coffee makers, refrigerators, lighting). The home network 102 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. Home network 102 may include multiple networks or subnetworks, each of which may include, for example, a wired or wireless data pathway. The home network 102 may include a circuit-switched network, a packet-switched data network, or any other network able to carry electronic communications (e.g., data or voice communications). For example, the home network 102 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The home network 102 may include one or more networks that include wireless data channels and wireless voice channels. The home network 102 may be a wireless network, a broadband network, or a combination of networks includes a wireless network and a broadband network.

The communication link over which the user devices 106a, home surveillance devices 106b, and appliances 106c communicate (e.g., exchange images and commands) with the home monitoring system 104 may include a local network. The local network may include 802.11 "Wi-Fi" wireless Ethernet (e.g., using low-power Wi-Fi 33 chipsets), Z-Wave, Zigbee, Bluetooth, "Homeplug" or other "Powerline" networks that operate over AC wiring, and a Category 5 (CAT5) or Category 6 (CAT6) wired Ethernet network.

The home monitoring system 104 may be hosted on one or more local servers, a cloud-based service, or a combination of the two. The home monitoring system 104 can include one or more of an activity data collector 108, pattern recognition module 110, a rule evaluator 112, and a notification generator 114. Additionally, the home monitoring system 104 can include one or more databases, for example, for storing activity data 116, rules 118, and labels 120, where activity data 116 may be received from devices associated with the home network 102 by the home monitoring system 104, and rules 118 and labels 120 may be generated by the home monitoring system 104. Although described herein as an activity data collector 108, pattern recognition module 110, a rule evaluator 112, and a notification generator 114, the different functions of the home monitoring system 104 may be performed by more or fewer subsystems within the home monitoring system 104.

The one or more user devices 106a may include devices that host and display user interfaces. For example, a user device 106a is a mobile device that hosts one or more native applications (e.g., home monitoring application 124) that includes an application interface 126 (e.g., a graphical-user interface (GUI)) through which a user of the user device 106a may interact with the home monitoring system 104, described in more detail below with reference to FIG. 5. The user device 106a may be a cellular phone or a non-cellular locally networked device with a display. The user device 106a may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 106a may perform functions unrelated to the home monitoring system 104, such as placing personal telephone calls, playing music, playing video, displaying pictures, browsing the Internet, maintaining an electronic calendar, etc.

In some implementations, user device 106a may be a general-purpose computer (e.g., a desktop personal computer, a workstation, or a laptop computer) that is configured to communicate with the home monitoring system 104 over home network 102. The user device 106a may be configured to display an application interface 126 that is generated by the user device 106a or by the home monitoring system 104. For example, the user device 106a may be configured to display a user interface (e.g., a web page) provided by the home monitoring system 104 that enables a user to perceive images captured by the home surveillance device 106b (e.g., a camera) and/or reports related to the home monitoring system 104 (e.g., notifications generated by notification generator 114).

In some implementations, a device 106a or 106b may be a "smart" speaker including a voice-user interface (VUI) that is configured to communicate with the home monitoring system 104 over home network 102. The "smart" speaker may be configured to provide a user with sound-based notifications (e.g., notifications generated by notification generator 114). The "smart" speaker may be configured to receive voice commands from the user to the home monitoring system 104, for example, voice commands responsive to a notification from the home monitoring system.

Home monitoring application 124 refers to a software/firmware program running on the corresponding mobile device that enables the user interface and features described throughout. The user device 106a may load or install the home monitoring application 124 based on data received over a network or data received from local media. The home monitoring application 124 runs on mobile devices platforms, such as iPhone, iPod touch, Blackberry, Google Android, Windows Mobile, etc. The home monitoring application 124 enables the user device 106a to receive and process image and sensor data from the home monitoring system 104. The home monitoring application 124 is described in more detail below with reference to FIG. 5.

The one or more user devices 106a may receive the data from the home monitoring system 104 through the home network 102. User device 106a may receive the data through the home monitoring application 126 relayed from the home monitoring system 104 through the home network 102.

Although the one or more devices 106a, 106b, and 106c are shown as being connected to the home network 102. In some implementations, the one or more devices 106a, 106b, and 106c are not connected to the home network 102. In these implementations, the one or more devices 106a, 106b, and 106c communicate directly with one or more of the home monitoring system components and no network (e.g., Internet) connection or reliance on remote servers is needed.

In some implementations, the home monitoring system 104 may be hosted locally on a user device 106a of the one or more user devices 106a. The home monitoring system 104 may be part of a home surveillance device 106b (e.g., a home surveillance control unit)

Home monitoring system 104 includes site-specific human and/or object models 128, which can be trained using activity data 116 collected by the activity data collector 108 from the devices 106a, 106b, and 106c in the home network 102. Details of the training of the site-specific human and/or object models 128 is described in more detail below.

Figure 2A:
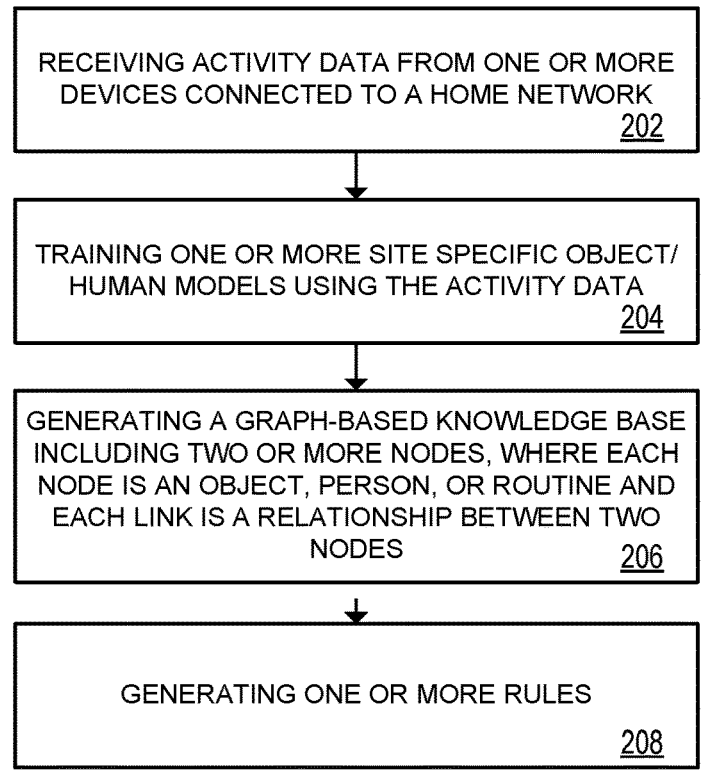
FIGS. 2A-2B are process flow diagrams of example processes of the home monitoring system that provides notifications.
Figure 2B:
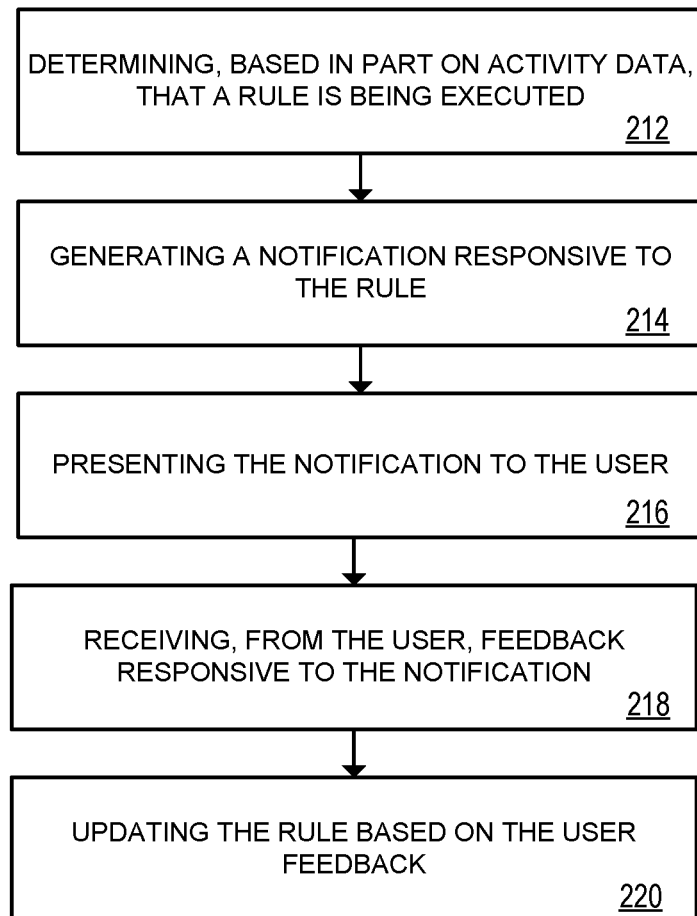

FIGS. 2A-2B are process flow diagrams 200 and 220 of example operation of the home monitoring system 104 that provides notifications. In general, the operation of the home monitoring system 104 may include receiving activity data 116 from one or more devices 106a, 106b, 106c that are connected to the home network 102 (202). For example, an activity data collector 108 can collect data from devices 106a (e.g., a mobile phone), 106b (e.g., a security camera), and 106c (e.g., a coffeemaker, smart thermostat) that are connected to a home network 102 (e.g., a Wi-Fi network in a home).

A pattern recognition module 110 can analyze the activity data 116 and train one or more site-specific object/human models 128 using the activity data 116 (204). For example, a site-specific object/human model 128 can be a human model for an occupant of the home, which can be trained using soft biometric data in the activity data 116. In another example, a site-specific object/human model 128 can be an object model for a backpack, which can be trained using image data of the activity data 116.

A graph-based knowledge base is generated for the home network 102, including two or more nodes, where each node is an object, human, or routine in an area monitored by the home network 102 and each link is a relationship between two or more nodes (206). For example, two nodes can be a person "Jane" and a smart phone associated with Jane (e.g., "Jane's phone"), where the link between the node "Jane" and the node "Jane's phone" defines a relationship (e.g., Jane owns Jane's phone) between them. Further details about generating a graph-based knowledge base is discussed below with reference to FIGS. 3A-C.

One or more rules defining, for example one or more of objects, persons, routines or a combination thereof are generated by the rule evaluator 112 (208). A rule may be defined, for example, based on observations of established relationships in the graph-based knowledge base. In one example, a rule can be "Jane and Jane's phone exit the house together," where Jane and her phone are observed exiting the house together ten times over the course of ten days. The observation of "Jane and Jane's phone exit the house together" are reflected as a strong correlation in the graph-based knowledge base, where the sub-graph representing Jane, Jane's phone, the house, and the act of exiting the house is defined in the knowledge base. The sub-graph can then be used to generate a rule, where a violation of the rule (e.g., Jane leaves the house without Jane's phone) will trigger a notification.

In some implementations, a user can define a rule, for example, using elements from the graph-based knowledge base. In one example, the knowledge base may include elements "Jane's car" and "Bob," where Bob is not associated with "Jane's car" in any way. A user can generate a rule where the home monitoring system 104 generates a notification if "Bob" is ever detected in "Jane's car."

Based in part on activity data 116, the rule evaluator 112 can determine that a rule 118 is being executed (212). For example, Jane's car may be detected (e.g., by image data from a security camera) in the driveway. One or more notifications responsive to the rule 118 is generated (214) and presented to the user (216). Further detail about determining rule execution and generating notifications responsive to the rule is discussed below with reference to FIG. 4.

The home monitoring system 104 can receive user feedback responsive to the notification from a user (218), and updates the one or more rules 118 based in part on the user feedback (220). For example, a user can choose to dismiss a notification based on a rule, which may cause the home monitoring system to interpret the rule as unimportant to the user. Further details about user feedback responsive to notifications is discussed below with reference to FIGS. 5A-5E.

Activity Data Collection

Activity data collector 108 receives activity data from devices 106a, 106b, and 106c connected to the home network 102. Activity data can be actively requested by the activity data collector 108 from the one or more devices connected to the home network 102. In some implementations, activity data may be pushed by the one or more devices 106a, 106b, 106c. For example, a home surveillance device 106b (e.g., a camera) may routinely (e.g., at a set interval or on a schedule) push image or video feed to the home monitoring system 104 via the activity data collector 108.

Activity data 116 can include, but is not limited to, information relating to device position (e.g., geo-location, altitude), operational status (e.g., on/off, functions being performed), image data (e.g., video, photographic, optical), audio data (e.g., recorded audio, transmitted audio), sensor data (e.g., movement, temperature, water, environmental, light, smoke detector, air quality, pressure, etc.), wireless signal data (e.g., connected networks, signal strength and latency, inferred position, etc.).

In some implementations, the home monitoring system 104 can access (e.g., can be authorized by the user to access) $3^{rd}$-party data. For example, $3^{rd}$-party data can include, but is not limited to: traffic data, weather data, rideshare availability data, and the like.

In some implementations, one or more subsystems may pre-process activity data before it is received by the activity data collector 108. For example, a home security system including one or more home surveillance devices 106b (e.g., cameras) may pre-process video/image activity data to identify humans or objects in the video/images prior to providing the activity data 116 to the home monitoring system 104. In some implementations, a user device may provide supplemental information with the activity data 116 that assists in identifying a type of activity related to the activity data 116. For example, a "smart" watch or activity-tracking personal device or application may provide supplemental information identifying a type of activity in which a user is engaged (e.g., a workout or exercise).

The activity data collector 108 may collect activity data 116 from devices in the home network 102 during a training period (e.g., a week, a month, etc.) in order to establish user activity and patterns in the home network. The activity data collector 108 may collect activity data 116 periodically after an initial training period, for example, such that the home monitoring system 104 can detect changes in routines and/or patterns.

In some implementations, one or more devices (e.g., user devices 106a) may be tracked while connected to the home network 102 using, for example, a wireless signal or other connectivity from the one or more user devices 106a. For example, a signal strength for a user device 106a (e.g., a user's mobile phone) relative to a wireless signal receiver (e.g., a Bluetooth receiver or a Wi-Fi receiver) may be tracked. User devices 106a that are Bluetooth or Wi-Fi enabled may also be tracked while connected to the home network 102, for example, as the device enters/exits the home (e.g., by tracking when the device is in range to join the home network 102). Other objects (e.g., car keys) can be modified to include network connectivity using, for example, a Bluetooth keychain.

In some implementations, one or more devices 106a, 106b, 106c may transmit inertial measurement units (IMU) data or other positional data (e.g., global positioning data (GPS), altimeter data, or the like) back to the home monitoring system 104, which may be collected as activity data 116 by the activity data collector 108. For example, a "smart" watch can transmit IMU data for a user wearing the smart watch. In another example, a pet wearing a Bluetooth enabled collar can transmit IMU data for the pet's movements within the home network 102. In yet another example, a mobile phone carried by a user can transmit IMU data for the user.

An area included within the home network 102 may be defined, for example, as a physical area that can be monitored (e.g., through video surveillance) using surveillance devices 106b, as an area within which a device 106a may have connectivity to the network (e.g., can "join" the network), and/or as an area defined by the physical location including, for example, a house and surrounding property (e.g., driveway). For example, the area included within the home network is defined by the boundaries of where the user devices 106a have connectivity through the home Wi-Fi network. In another example, the area included within the home network is defined as the house and driveway of the property of whose boundaries are monitored by a set of home surveillance devices 106b.

The home monitoring system 104 may use network connectivity of a device 106a with respect to the home network 102 to determine a position of the device 106a in an area (e.g., a house) covered by the home network 102. For example, signal strength between the device 106a and various transmitters/receivers (e.g., Bluetooth of Wi-Fi enabled transmitters/receivers located around the area) can be analyzed to determine a position of the device 106a in the area covered by the home network 102.

In some implementations, objects that do not have network connectivity (e.g., a backpack, a coffee mug, a violin case) are tracked through an area within the home network 102. Objects that are not connected to the network (e.g., not Bluetooth or Wi-Fi enabled) may be tracked, for example, using activity data 116 collected by the activity data collector 108 from one or more home surveillance devices 106b (e.g., camera). For example, an object can be identified in video footage from multiple surveillance cameras, such that the object can be determined to move along a geo-path (e.g., can be detected in cameras that have subsequent, adjacent fields of view) within an area.

In some implementations, an object may be documented in a database of three-dimensional (3D) image data, for example, objects that are common in most homes (e.g., musical instruments, particular brands of shoes or backpacks). The home monitoring system 104 can use the 3D image database for the object to bootstrap the model for what the object should look like, which can shorten the training period for the particular object.

In some implementations, a user may provide activity data 116 to the home monitoring system 104 instead of, or in addition to, waiting for the activity data collector 108 to gather sufficient activity data to recognize one or more patterns. A user may provide a 360° video of an item of interest, videos of a person with the item of interest entering/exiting the house, videos of the person without the item of interest entering/exiting the house, or other activity data that can replace or supplement the activity data 116 gathered by the home monitoring system 104. User-provided activity data 116 can be captured, for example, using one of the home surveillance devices 106b or a user device 106a, such that sufficient detail and various angles are captured for the home monitoring system 104 to process the item of interest. An application 124 (e.g., application 500 in FIG. 5) may include a functionality to guide a user in how to properly capture and upload the relevant activity data 116.

Pattern Recognition

Activity data 116 can be processed by a pattern recognition module 110 using analytics software (e.g., cluster analysis) and/or neural networks to determine one or more patterns in the collected activity data 116. Other analytical methods may include Hidden Markov Model (e.g., for sequence classification), Support Vector Machines/perceptron, or Conditional Random Fields.

In some implementations, the home monitoring system 104 can predict a functionality of a room (e.g., a kitchen, a bathroom) in the home based in part on a state of a user in the home (e.g., user is making coffee). For example, if a user is determined to be making coffee, the home monitoring system 104 make predict that the user should be in the kitchen, because the coffeemaker is known to be in the kitchen. The home monitoring system 104 may then use a camera 106b with a field of view including the kitchen to detect the user in the kitchen. A Kalman filter can be used to analyze how far the user has deviated from the predicted state (e.g., user is making coffee) without having to manually define rules dictating a routine.

In some implementations, the home monitoring system 104 may be initialized with one or more generic (e.g., non-site-specific) machine learning models based on supervised learning (e.g., trained using generic datasets of images). For example, the generic machine learning models can include image-based object detectors and classifiers trained on data collected from a large sample of labeled data (e.g., from existing installations of other home monitoring systems, staged data collections, and/or licensed datasets). For example, an object model may be a "mobile phone" model, trained by supervised learning using a database of generic mobile phone images, videos, or other data. In another example, a human model may be trained by supervised learning using a database of generic human images, video, soft biometrics, or other data (e.g., average human height, head location, anticipated movements).

In some implementations, pre-trained neural networks and computer vision-based object detection and tracking can be used to detect, localize, and classify objects and people in an area within the home network 102. For example, computer vision can be used to detect objects in images recorded by a security camera facing a driveway of the house. An object (e.g., a car) can be tracked as it enters the driveway and a position of the object in the driveway (e.g., where the car is parked) can be computed. A generic car model (non-site-specific model) can be used to determine that the object is a car. The pattern recognition module 110 may then train one or more of the generic machine-learning models to be site-specific human and/or object models 128 using unsupervised learning techniques. Unsupervised learning techniques (e.g., cluster analysis) using activity data can be used to train one or more human/object models that are site-specific to the home network 102, (e.g., cluster analysis of activity data 116 collected by activity data collector 108).

Cluster analysis (e.g., k-means, hierarchical cluster analysis) can be used to recognize similar recurring objects, people, places, and activities that occur in the home network 102. For example, cluster analysis can be used to differentiate between similar instances of a same object (e.g., a same car parked in a driveway of the house). Correlations between sightings of various instances within the activity data 116 can be identified (e.g., by the pattern recognition module), which can translate into learned patterns (e.g., schedules or routines) for particular identified objects and/or persons.

In one example, as various vehicles come and go from the driveway, features are extracted from vehicle appearance and activities (e.g., where they park, when they arrive/depart from the driveway), and then look for clustering in the multi-dimensional feature space. Vehicle observations can yield distinct clusters of appearance features, where each cluster can represent a respective unique car (e.g., a car belonging to each occupant of the home). A vehicle model can be trained for each vehicle using these respective features. In some implementations, the raw data (e.g., the security camera footage) can be provided to a neural network to learn more features in order to recognize the one or more vehicles. In another example, patterns can be determined from cluster analysis. For example, Jane's car parks in location X 95% of the time, or Bob's car arrives home between 6 and 7 pm on weekdays.

In some implementations, scene segmentation can be used for analysis of the collected activity data. For example, images from security cameras surveilling the outside of the house are used to label elements of the scene (e.g., "pavement," "sidewalk," "grass," "tree," or "mailbox") to create a model of the scene, with expectations for what should happen there (e.g., "this appears to be a driveway", "we expect cars to drive in from the roadway and park", and "people to get out of those cars and walk into the house").

Site-specific human models 128 may be trained using, for example, soft biometrics (e.g., general appearance, size, and gait recognition), facial recognition software, or the like. In another example, activity data 116 including video/image data of an object (e.g., a backpack) collected from home surveillance devices 106b (e.g., security cameras) can be used to train a site-specific object model 128 for the object. In yet another example, activity data 116 can include audio (e.g., a person speaking) collected from home surveillance devices 106b to train a site-specific human model 128 (e.g., Sam and Sam's voice).

The home monitoring system 104 can include multiple site-specific human models (e.g., one for each occupant of the house) and multiple site-specific object models (e.g., one for each object of importance in the house).

In some implementations, the pattern recognition module 110 can use activity data 116 from one or more home surveillance devices 106b (e.g., cameras) and use video analytics and/or neural networks to visually recognize a person or people while they are in an area (e.g., a house) within range of the home network 102 (e.g., entering/leaving the house, walking inside the house) and identify each person. Each person in the home network 102 can be identified by the pattern recognition module 110 using a site-specific human model 128, and the typical movements of the person can be tracked entering/exiting and moving within the space covered by the home network 102 (e.g., inside/around the house).

The pattern recognition module can use the activity data 116 collected to analyze and construct a geo-path for each person and each object (e.g., a mobile device) determined to be connected to the home network 102. A geo-path can include point of entry into the area (e.g., a front door of a house) included within the home network 102, a point of exit out of the area included within the home network 102, as well as the path that the person/object travels along through an area within the home network 102. For example, a geo-path can include a path tracked from a front door, through a kitchen area, and to a bedroom of a house. A geo-path may also use altimeter data to determine if a person or object is located on an upper-story of a house or building.

In some implementations, a geo-path of a user device 106a can be determined using wireless receivers located around the area included within the home network. For example, Wi-Fi or Bluetooth receivers located around a house can be used to determine a location of a smart phone (e.g., using relative signal strength between the receivers and the smart phone) as the smart phone travels around the house.

The pattern recognition module 110 can use activity data 116 collected by the activity data collector 108 to identify signatures of devices 106a (e.g., internet protocol (IP) address, or other digital identifier) and associate them with one or more users of the device. For example, if a particular user is tracked through a house along a particular geo-path (e.g., using activity data from various devices 106a, 106b, 106c) and a mobile phone with a particular digital signature is tracked along a similar geo-path, the pattern recognition module 110 may determine that the particular user is a user of the mobile phone with the particular digital signature.

The pattern recognition module 110 may use video analytics and/or neural networks to train site-specific object models 128 for objects that are detected in activity data 116 collected by the activity data collector 108 (e.g., an object that is detected in video footage from a security camera). For example, the pattern recognition module 110 may determine that video footage of a backpack collected from a security camera in the home network 102 over a period of several weeks is a same backpack. The video data of the backpack object may be used to train a site-specific object model 128 for the backpack, which can then be used to identify the backpack in other activity data 116 (e.g., images from one or more cameras in the home network). One or more statistical measurements can be made that set how accurate continued observations are of the backpack object when compared to the site-specific backpack model. The home monitoring system 104 can determine an accuracy of a site-specific object model by testing if a new observation of an object fits the model for the particular object (e.g., the backpack), or if the site-specific model for the backpack is not sufficiently predictive and requires additional training data.

In some implementations, one or more general classifiers can be used to label objects that are detected in the home network 102. For example, given an image of a specific car, a general classifier may be able to correctly label the car as a sedan, or even as a "green" "Honda" "Accord". In another example, a general classifier might be used to label humans as male or female, and apply labels that correspond to age, height, or other physical characteristics.

Natural language processing of user-provided feedback (e.g., responsive to notifications from the home monitoring system 104), can be used by the home monitoring system 104 to assign, improve, or remove labels from objects and/or humans identified by the pattern recognition module 110, or assigned to the one or more site-specific human/object models 128. Discussion of user feedback provided responsive to notifications from the home monitoring system are discussed in more detail below with reference to FIGS. 3A-3C and FIGS. 5A-5E.

Figure 3A:
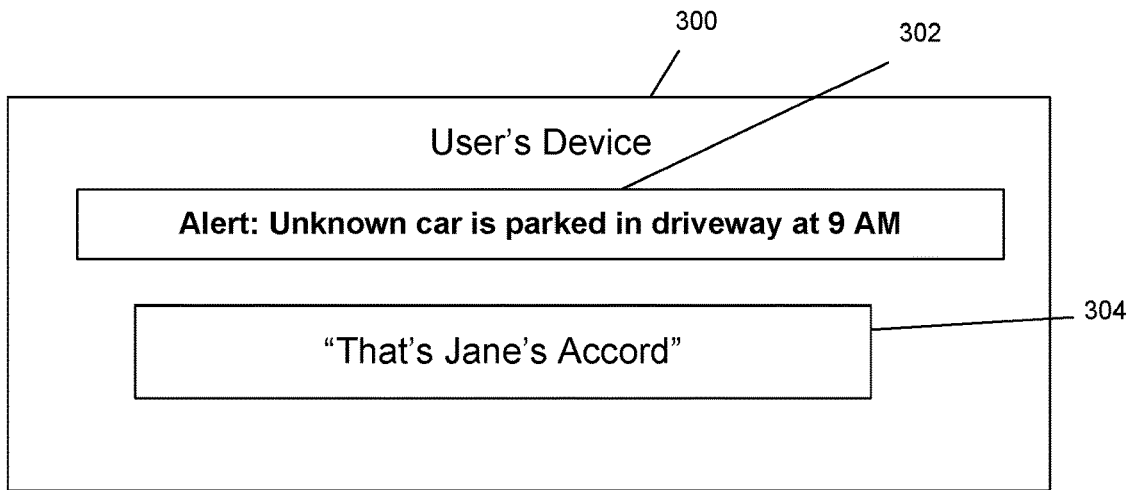
FIG. 3A is an example notification presented to a user.

Object and human labels applied by one or more general classifiers can be verified or further specified by a user on a user device 106a. In some implementations, an object or human that is detected by the home monitoring system 104 and identified as significant (e.g., statistically significant), can be provided to the user on the user device 106a for a label or to verify a generic label applied by the one or more general classifiers. FIG. 3A is an example notification presented to a user on a user device 106a requesting verification/specification of a label by the user for an object. In the example of FIG. 3A, a user may receive the notification 300 including text 302 "Alert: unknown car is parked in driveway at 9 AM" such that the general classifier has previously labeled the object in the driveway as a "car." The user may provide a response 304 (e.g., as text or speech-to-text input) including "That's Jane's Accord."

Figure 3B:
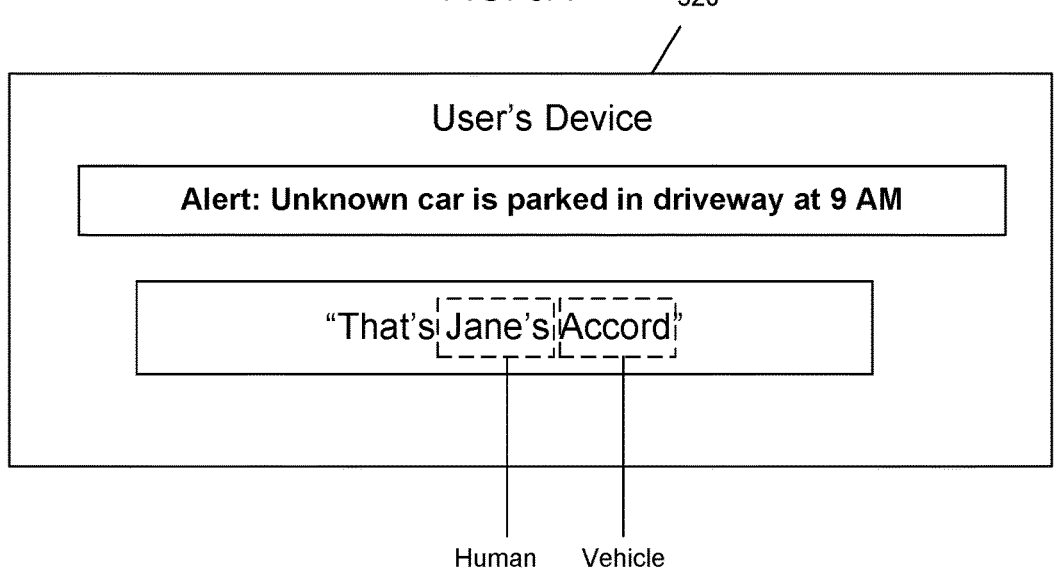
FIG. 3B is an example of natural language processing of a user response to extract labels.

The home monitoring system 104 uses natural language processing, as depicted in FIG. 3B to process the user's response and determine that "Jane" is a label that refers to a human owner of the car and "Accord" is a label that refers to the "car" previously identified by the general classifier. These labels may be applied to the objects that have been detected. In some examples, the identification of a human (e.g., "Jane") associated with the identified car, directs the home monitoring system 104 to look for the human in the area within the home network (e.g., look for Jane in/around the house when her car is in the driveway).

Figure 3C:
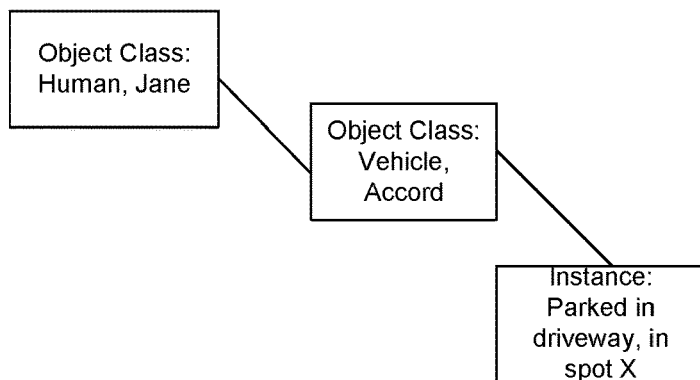
FIG. 3C is an example of a graph-based knowledge database.

In some implementations, identified objects/people and respective patterns associated with the identified objects/people are stored in a graph-based knowledge database, where classes (e.g., categories of objects/people) and instances (e.g., events) are represented by nodes and relationships between objects, people, and respective patterns are represented as links between the nodes, as depicted in FIG. 3C. For example, an observed pattern that a Honda Accord belonging to Jane arrives in the driveway and parks at a particular location in the driveway at 9 AM every weekday, may be represented by the knowledge database as "Jane (person)", "Honda Accord (car)" as "is parked in spot X in the driveway" as nodes, and where the car, person, and spot in the driveway are all connected in the system by relationship links. Relationship links can be "Jane usually drives the car," "The car is usually parked in spot X." Additionally, attributes can be included with a node, for example, "Jane's car is a Honda Accord," "The Honda Accord is green," or "at 9 AM on weekdays."

In some implementations, the pattern recognition module 110 can detect relationships between human users and objects from the collected activity data 116. For example, a particular user may be detected in the activity data 116 to be carrying a particular mobile phone by tracking both the particular user and the particular mobile phone through the home network 102 (e.g., entering/exiting the house together, walking around the house together). In another example, a particular user may be detected in the activity data 116 to be carrying a backpack by tracking both the particular user (e.g., using a site-specific human model for the particular user) and the backpack (e.g., using a site-specific object model for the backpack) using image data collected from the home surveillance devices 106b in the home network 102.

In some implementations, the pattern recognition module 110 can detect routines for human users from the collected activity data 116. A routine may be detected by the pattern recognition model and determined to be significant such that one or more rules 118 are generated for the routine (e.g., a "Jane's morning routine"). A routine can include a geo-path of the user through the area within the home network 102, a schedule including a start and stop time, a set of actions performed by the user, and a repetition frequency. A routine can include multiple sub-routines, where the sub-routines can be combined together into a routine. For example, a morning routine for a user may include sub-routines i) wake up and use bathroom, ii) walk to kitchen and make coffee, and iii) leave the house. Each one of the sub-routines can have an associate time frame and duration in which the sub-routine is completed (e.g., "wake up and use bathroom" is from 7:15-7:45 AM).

The home monitoring system 104 can learn a typical routine for the user and generate the one or more rules 118 for the routine. In some implementations, a user could create a routine. For example, the user can put the home monitoring system 104 into a learning mode (e.g., using the application 124) and proceed through a normal routine. The home monitoring system 104 can gather activity data 116 while in learning mode and use the activity data 116 gathered to generate one or more rules 118 for the routine.

In some implementations, a user can input information relating to a routine into the home monitoring system 104, for example, through an application interface 126. The user may provide information relating to a "grace period" or snooze functionality in the routine (e.g., allow for a 15 minute snooze during wake up), or custom reminders to send via generated notifications (e.g., send a notification to leave 20 minutes before departure time). The user may also provide prioritization of sub-routines in a particular routine, or designate which sub-routines can be skipped when needed. For example, a user can designate (e.g., through application 124) that "walk to kitchen and make coffee" is optional if the user is running behind schedule. Accordingly, if the home monitoring system 104 determines that the user is running behind schedule (e.g., the user is not detected to be awake at a designated time in the rule), the home monitoring system 104 can perform actions to assist the user in getting back on schedule (e.g., can notify the user to skip their morning coffee, can automatically order a coffee delivery/pick up order).

In some implementations, the pattern recognition module 110 can use sequence prediction model and activity classification to determine one or more rules for a routine. The pattern recognition module 110 can determine a sequence of activities associated with a routine (e.g., a morning routine) where a user follows a predictable pattern of activities and can include a set amount of time for each activity. For example, a user may follow a sequence including "wake up," "drink coffee," "get dressed," and "leave for work," where each activity can be defined by clustering activity data 116 collected during the activity (e.g., "wake up" includes an alarm on a user's phone, lights turning on in a bedroom). Given a detected activity (e.g., user is "drinking coffee"), the sequence prediction model may predict a next activity in a routine (e.g., "get dressed") and can trigger a notification based on an observation of an anomaly (e.g., user has not gotten dressed when expected).

In some implementations, a user may input information relating to a user and/or an object into the home monitoring system 104, for example, through application 124. The user may provide information relating to user/object appearance, location, routine, and/or relationships with other users and/or objects. A user may choose to provide, for example, images of an object (e.g., a wallet) in the form of a video, 3D image, or images from various angles to the home monitoring system 104 to assist in training a site-specific model for the object. In another example, a user may provide a digital signature (e.g., IP address or Bluetooth address) for a device 106a to the home monitoring system 104, and additionally include other identifying information (e.g., a type of device) to the home monitoring system 104. Further discussion of the application 124 is discussed below with reference to FIG. 6.

Patterns detected by the pattern recognition module 110 are evaluated by the rule evaluator 112 to determine whether to generate one or more rules 118 corresponding to the pattern. Patterns may be determined to be significant using a variety of metrics including, but not limited to, frequency of detection of the pattern (e.g., how often a pattern occurs), a user-defined significance (e.g., where a user instructs the system to track a pattern), strength of a pattern (e.g., pattern with minimal deviation).

In some implementations, a pattern might be determined to be stronger or less strong depending on a specificity of objects/humans involved. For example, a pattern including Jane's car has a high degree of specificity because the pattern requires the car to belong to Jane in order to be recognized as part of the pattern. In another example, a pattern including a generic object that is not associated with a particular person (e.g., a coffee mug or an umbrella) has a low degree of specificity because the pattern does not require the object be associated with a particular person in order to be recognized as part of the pattern. In another example, a dog-walker or a delivery person may be a different individual for each instance, but each be associated with a particular logo or company and thus have a high degree of specificity (e.g., a FedEx delivery person delivers packages at 4 PM).

Rule-Based Notifications

Rule-based notifications can be generated (e.g., by notification generator 114) based in part on pattern recognition by pattern recognition module 110 of the activity data 116 collected from devices 106a, 106b, 106c in the home network 102. Objects and/or persons of interest identified in one or more rules 118 by the rule evaluator 112 and defined by one or more site-specific human/object models 128 may be tracked through an area (e.g., a house) within a home network 102 using one or more of the user devices 106a, home surveillance devices 106b, and/or appliances 106c.

The notification generator 114 can provide a notification to the user through an application 124 on the user device 106a, for example, in an application interface (e.g., graphical user interface (GUI)). In response to the notification generated by the notification generator 114, a user on user device 106a can provide feedback to the home monitoring system 104. User feedback, for example, in the form of natural language user feedback, can assist the home monitoring system 104 to refine rules 118 and/or determine a significance (e.g., relevance or irrelevance) of a particular rule 118. For example, the home monitoring system 104 can determine that a user usually (e.g., statistically significant) exits the house with a user device (e.g., mobile phone), and prompt the user if the user would like to create a rule to be reminded to take the mobile device when leaving the house. In some implementations, a statistical significance can be determined by values and/or thresholds of occurrence. For example, a user and the user's mobile phone exiting the house together 80% of the time can be determined to be a significant rule (e.g., "User and user's phone exit the house together"). In another example, a user parking the user's car in a particular spot in the driveway 9 out of 10 times that the user is determined to be home can be determined to be a significant rule (e.g., "when user is home, user's car is parked in the driveway").

The home monitoring system 104 analyzes activity data 116 using the one or more rules 118 that have been generated (e.g., though pattern recognition and the site-specific human/object models after an initial training period). Activity data 116 can trigger an evaluation step for a particular rule 118. For example, if a user is determined to be leaving the house at 8 AM, and the home monitoring system 104 determines that there is a rule 118 including "user carrying backpack between 7:30-8:30 AM" is being executed, the home monitoring system 104 (e.g., using the rule evaluator 112) can analyze activity data 116 from one or more surveillance devices 106b in the home network 102 (e.g., camera at the front door) to determine whether the user is carrying the backpack. A site-specific model 128 of the backpack that is associated with the particular rule 118 may be used to analyze the activity data 116 (e.g., image data) of the user leaving the house. If the user is determined to not be carrying the backpack, a notification is generated by the notification generator 114 and is provided to the user (e.g., on the user device 106a).

In another example, if a vehicle is determined to be arriving in a driveway of the house at 4:45 PM, and the home monitoring system 104 can determine that there is a rule 118 including "Jane's car parks in the driveway between 4:30-6 PM" is being executed. The home monitoring system 104 analyzes activity data 116 (e.g., image data) from a surveillance device 106b (e.g., security camera) that overlooks the driveway and determines, based on a site-specific model of "Jane's car" whether the arriving vehicle is "Jane's car." Based on a determination if the arriving vehicle is or is not "Jane's car" a notification can be generated by the notification generator 114 and provided to the user.

In another example, if an item of interest (e.g., a laptop computer) is determined to be leaving the house, the home monitoring system 104 can determine that there is a rule 118 including "Sam leaves the house with Sam's laptop computer." If the home monitoring system 104 does not, however, detect Sam leaving the house with the laptop computer, it can generate a notification and provide the notification to the user indicating the anomaly (e.g., that the laptop might be stolen).

Figure 4:
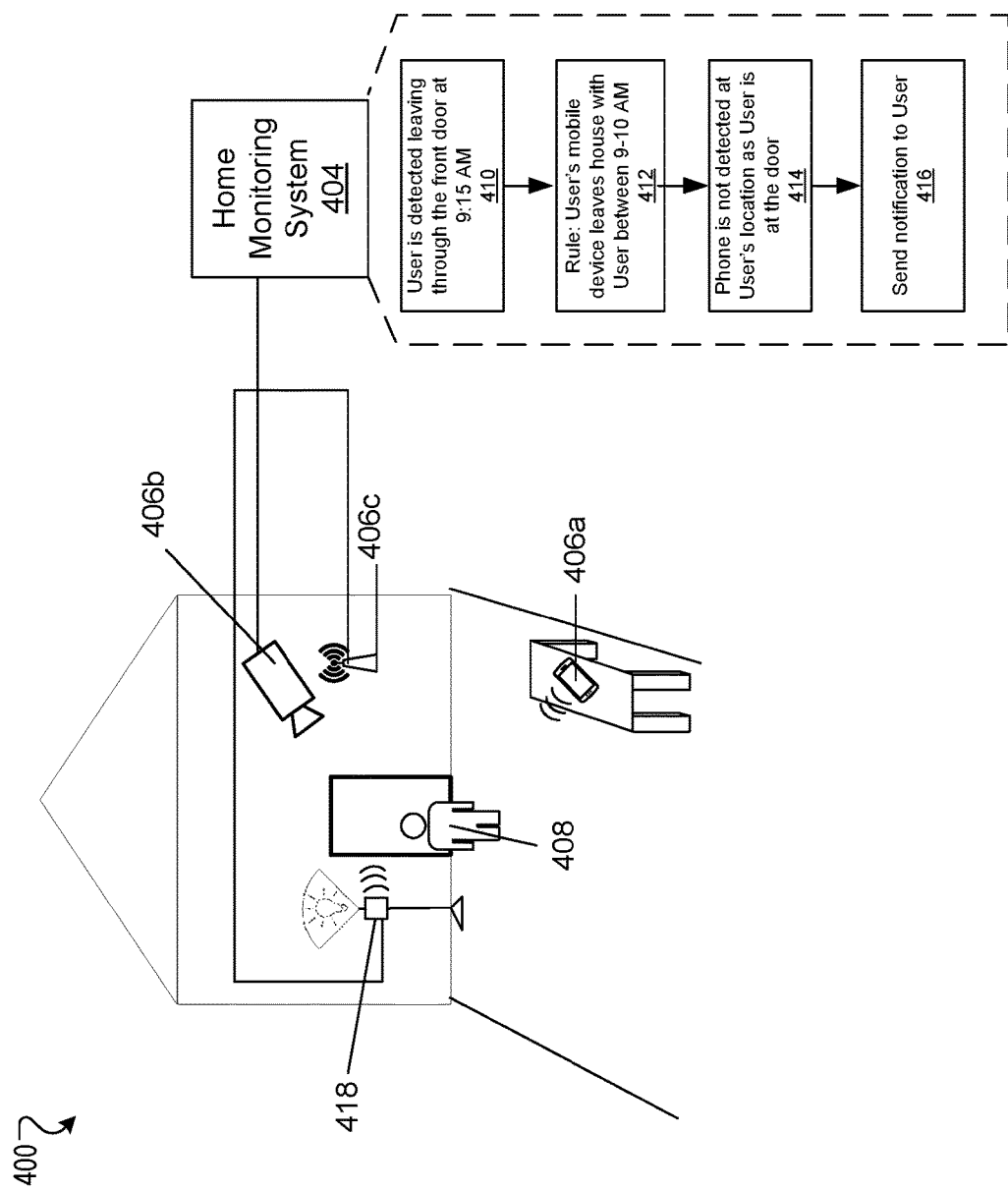
FIG. 4 is an example of a home monitoring system generating a rule-based notification.

FIG. 4 is an example 400 of a home monitoring system 404 generating a rule-based notification based on activity data collected from devices in the home network. In example 400, the home monitoring system 404 collects activity data from a user's mobile phone 406a, a security camera 406b, and a Wi-Fi or Bluetooth receiver 406c, located near an entrance to the house. The home monitoring system 404 detects the user 408 leaving through the entrance to the house (410) (e.g., at 9:15 AM) and evaluates rule "User's mobile phone leaves the house with User between 9-10 AM" (412). Activity data 116 including a wireless (e.g., Bluetooth or Wi-Fi) signal from a user's smart phone 406a and image data generated by a security camera 406b (e.g., at the front door of the house) can be collected by the activity data collector 108, analyzed by the pattern recognition module 110 using one or more site-specific human/object models (e.g., a human model for the user 408, and an object model for the user's mobile phone 406a), and evaluated against the rule (412). If the user is detected leaving the house (e.g., based on images from a security camera) without the user's mobile phone 406a, a rule violation is detected (414) and an alert/notification can be generated in response (416). For example, the phone is determined to be stationary using the phone (e.g., using an accelerometer on the phone and/or a GPS of the phone) while the user is exiting the house. In another example, the Wi-Fi/Bluetooth receiver 406c near the doorway is not within range of the user's phone while the user is exiting the house. In yet another example, signal strength or time-of-flight to various wireless receivers positioned around the house can be used to triangulate the position of the device.

In yet another example, a connection strength between two different user devices 106a, device A and device B (e.g., a user's mobile phone and a user's smart watch) can be used to determine if one or more of the user devices 106a (e.g., the user's mobile phone) are with the user. If activity data for device A indicates that device A (e.g., the user's smart watch) is with the user (e.g., the user has unlocked the smart watch for use) and the smart watch is paired and within proximity to the user's mobile phone, the home monitoring system 404 can determine that the user has the user's mobile phone.

In some implementations, once a rule 118 has been generated by the rule evaluator (e.g., the pattern recognition module establishes a threshold of confidence that an object/person or routine exists), a notification is generated and provided to the user device 106a. The notification may include, for example, annotated imagery (e.g., a camera still including an object/person in question). Responsive to the provided notification, a user on the user device 406a can choose to ignore the notification or to respond (e.g., in order to clarify, elaborate, or otherwise respond) using natural language (e.g., text, speech-to-text) input. For example, the home monitoring system 404 can provide the user with the ability to respond to questions with yes/no answers, multiple choice answers, and/or space to fill in with user-provided natural language responses.

In some implementations, notifications are provided for presentation on a user device 306a. Notifications can include visual communication (e.g., text, image, video, or the like), audio communication (e.g., alert chime, melody, or the like), haptic communication (e.g., a vibration), or a combination thereof. A notification can be a pop-up message that appears on a locked or unlocked screen of a smart phone. A notification can be a message delivered via an application running on a user device 406a, sent through a messaging system (e.g., SMS or messaging client), sent through email, or the like. In one example, a notification can be a pop-up message and/or a haptic communication (e.g., a vibration, mechanical feedback) that is presented on a user's smart watch. In another example, a notification can be an audible alert (e.g., chime, melody, and text-to-speech message) presented through a digital assistant. In yet another example, a notification can be provided through a security camera that is capable of two-way audio communication. In example 400, a notification presented on the user's phone may include an alarm sound to alert the user that it is being left behind.

In some implementations, notifications are provided for presentation on a device in the home network 102. Notifications can be delivered to one or more devices and using one or more mediums (e.g., visual, audio, haptic) simultaneously or consecutively (e.g., as a detected anomaly or rule violation escalates). Devices or appliances can include but are not limited to: lights fixtures (e.g., a network-connected lamp), appliances (e.g., "smart" refrigerator), home electronics (e.g., television, coffeemaker), stereo systems, "smart" speakers, or other devices that include network connectivity and are connected to the home network 102.

A notification can include a change in lighting (e.g., flashing lights, changing color of lights, dimming lights, otherwise changing appearance) for one or more light fixtures in the house. For example, if the rule evaluator 112 determines that activity data 116 for a user and an item of interest indicates that the user has forgotten the item of interest (e.g., an anomaly is determined with respect to a rule 118 including that the user should have their mobile phone when leaving the house), the home monitoring system 104 can generate a notification through the notification generator 114 including flashing one or more lights (e.g., at the front door) in the house. In example 400, a notification to the user (416) may include a changing of a lighting scheme (e.g., flashing light, changing color of light) of a lamp 418 near the entrance to the home that will visually cue the user 408 that they have forgotten their phone.

In some implementations, if the rule evaluator 112 determines that activity data 116 for a user indicates that the user is running late (e.g., an anomaly is determined with respect to a rule 118 including a morning routine), the home monitoring system 104 can generate a notification through the notification generator 114 including changing a lighting scheme (e.g., flashing one or more lights in the house, changing colors of lights, etc.). The lighting scheme can be adjusted to reflect a determined lateness (e.g., based on a sub-routine that the user is engaged in) of the user, to provide a visual cue to the user of a lateness relative to a routine. For example, a color of one or more lights in the house may be adjusted to a first color (e.g., green) if the user is running 5-10 minutes behind schedule, adjusted to a second color (e.g., red) if the user is running 10-20 minutes behind schedule, and flashed if the user is running more than 20 minutes behind schedule.

In some implementations, rules describing a routine are based on when a user should be completing each aspect of the routine rather than when the user actually does complete each aspect of the routine (e.g., if the user is chronically late). The rule evaluator 112 can determine from the activity data 116 how behind schedule a user is and adjust notifications as needed. For example, if a user is determined to nominally run late on a morning routine by 15 minutes, then the home monitoring system 104 may provide a wake-up notification 15 minutes earlier in order to compensate.

In another example, a rule 118 may include a vehicle (e.g., a carpool or a rideshare service) arriving in the driveway at a particular time of day (e.g., every weekday morning at 9 AM). Activity data 116 including image data capturing a vehicle in a driveway of a home may be collected, for example, by one or more security cameras in a home surveillance system. The home monitoring system 104 may determine using a site-specific vehicle model 128 that the vehicle in the driveway corresponds to a car belonging to a carpool or rideshare service, and generate an alert/notification to be presented to the user that the vehicle has arrived. For example, one or more lighting schemes in the house may be altered or a pop-up window may be presented on the user's mobile device. The home monitoring system 104 may also determine an estimated time that a user will complete a current routine (e.g., morning routine) and alert a member of the user's carpool/rideshare service of the estimated time to allow the carpool/rideshare service to plan accordingly.

A user may authorize the home monitoring system 104 to have access to one or more calendars. The home monitoring system 104 can incorporate calendar events (e.g., work meetings, after-school programs, appointments, date night) into the rule evaluator 112. The rule evaluator 112 can determine, based on one or more rules 118 and calendar events, to send a notification to a user. The rule evaluator 112 can identify one or more rules 118 that include user routines (e.g., morning routine, bedtime routine, dog walking routine), and whether the one or more rules 118 will be affected by a calendar event in one of the user's calendars. A determination can be made, for example, if a rule 118 includes an amount of time associated with completing a user's morning routine, a calendar entry includes an event at a location, and traffic conditions between the user's current location and the event location require an estimated amount of travel time. For example, a rule 118 may include a daily routine in which a user exits the house accounting for a 45-minute commute before a first calendar event in a work calendar. A wake up notification or alarm can be provided to the user on a user device based on the rule 118 including a 45-minute morning routine and the 45-minute commute to the first calendar event, for example, a notification that is 1.5 hours before the beginning of the first calendar event. In another example, a notification can be provided to the user on the user device based on a rule 118 including a 45-minute morning routine and a change in traffic (e.g., accidents, road conditions, etc.) between the current location of the user and the location of the first event in the calendar.

Rule Verification and Reinforcement

A user's feedback responsive to a notification can be used, for example, to build and/or modify a graph and then integrate the resulting graph into an existing knowledge database. Standard natural language processing can be used to process user feedback that has been provided, for example, in the form of text or speech-to-text.

Notifications provided to the user as well as user feedback from the user may be integrated into existing digital assistants, where speech-to-text or vice versa may be used to provide/receive notifications and feedback. For example, "Tell Alarm.com that's just the cleaners parking" may be provided by the user as feedback to a notification of an unidentified vehicle in the driveway of the house.

In some implementations, the user may provide feedback by "up-voting" or "down-voting" a notification indicating, for example, a relevance of the rule represented by the notification to the user. A user provided feedback may include gestures on a user's mobile phone, for example, swiping left/right, swiping up/down, pinching, tapping, or another gesture.

Figure 5A:
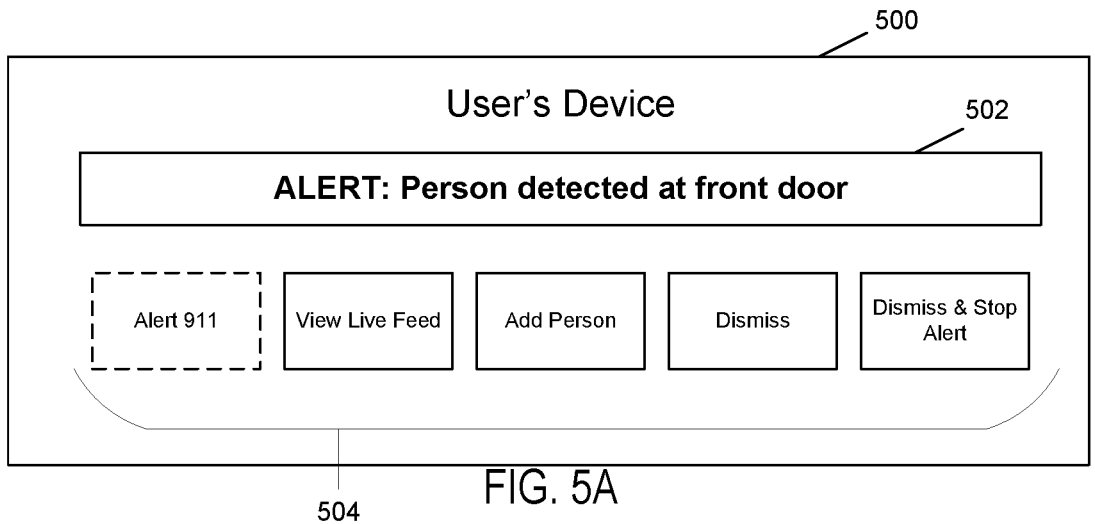
FIGS. 5A-5E are examples of notifications provided to a user on a user device and example user feedback options.

FIGS. 5A-5E are examples of notifications provided to a user on a user device and example user feedback options that the home monitoring system can use to verify and/or reinforce rules. In FIG. 5A the notification generator 114 provides a notification to the user device 106a, where the notification 500 represents a rule 502 (e.g., rule 118): "Person detected at front door." The user is presented with one or more options 504 responsive to the notification including, for example, to label the rule (e.g., "add person"), dismiss or remove the rule, or otherwise provide feedback to the home monitoring system 104. Additionally, depending on the rule 402 being presented, options 504 may also include "Alert 911," "View Live Feed" (e.g., live camera view of the driveway through application 124), or other situationally-relevant options. Options 504 can also allow for user text or speech-to-text input. The rule evaluator 112 can receive the user feedback responsive to the provided notification and use it to refine or otherwise alter the rule 502.

In some implementations, the home monitoring system 104 can determine to include one or more options 504 to control other devices 106a, 106b, 106c. For example, a front porch video camera detecting a package delivery may trigger a notification that includes the option to unlock a smart lock on the front door or the option to enable two-way audio communication via the front porch video camera.

In some implementations, the home monitoring system 104 can determine to include the one or more options 504 provided to the user responsive to the notification based in part on the nodes and relationship links of the knowledge graph that are referenced by the rule 502, and any uncertainty the home monitoring system 104 may have regarding nodes and/or relationships detected by the home monitoring system 104 but not yet confirmed by the user.

In some implementations, the home monitoring system 104 can provide options 504 that elicit a user response regarding the importance of the notification to the user. The system can allow for user feedback that includes information of relative importance or truth of a notification, for example, "this is true, keeping telling me when it happens," or "this is true, only tell me if it does not happen on schedule" (e.g., for a recurring item).

Figure 5B:
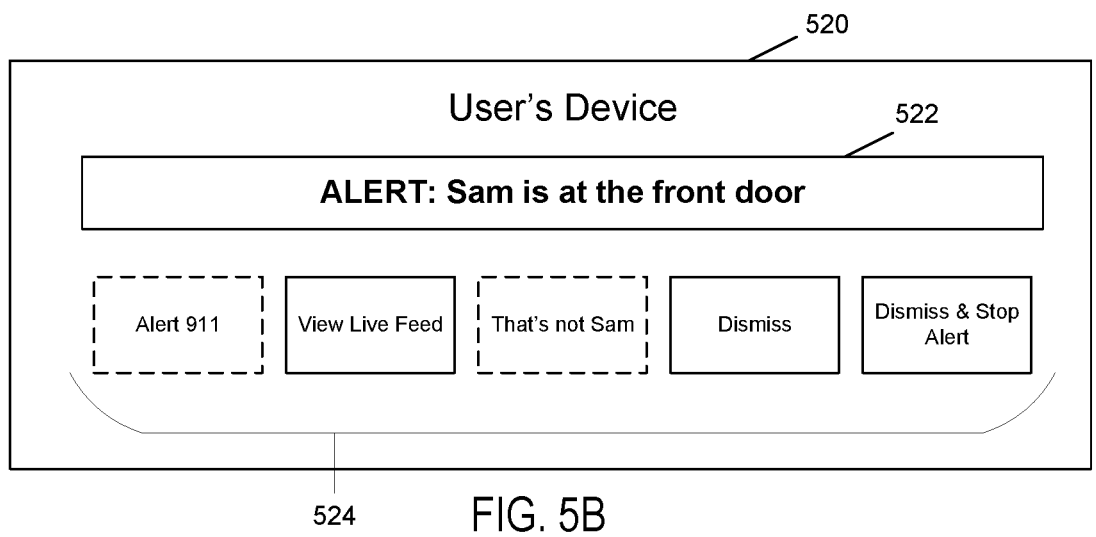

FIG. 5B is another example of a notification 520 provided to the user device 106a where the notification 520 represents a rule 522 (e.g., rule 118): "Sam is at the front door." The user is presented with one or more options 524 responsive to the notification including, for example, to correct the label "Sam," dismiss or remove the rule, or otherwise provide feedback to the home monitoring system 104 (e.g., text or speech-to-text input). In the example of FIG. 5B, the user may determine, from viewing a live feed (e.g., from a security camera) of the front door, that the person identified in the alert is not Sam and provide an alternative label to the home monitoring system 104 (e.g., "I don't know who that is" or "That's not Sam, that's Mike"). The rule evaluator 112 can receive the user feedback responsive to the provided notification and use it to refine or otherwise alter the rule 522.

Figure 5C:
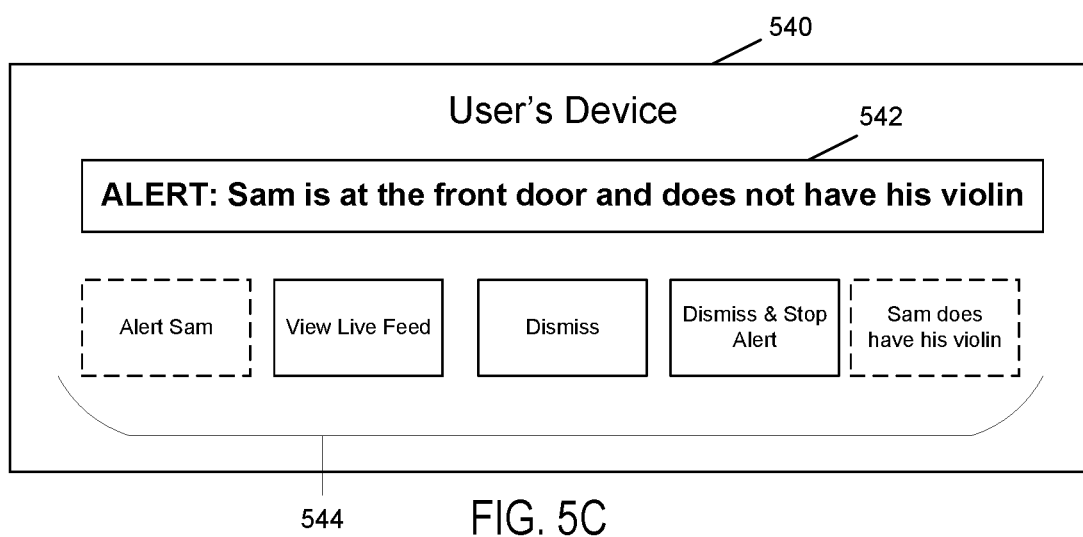

FIG. 5C is another example of a notification 540 provided to the user device 106a where the notification 540 represents a rule 542 (e.g., rule 118): "Sam is at the front door and does not have his violin." The user is presented with one or more options 544 responsive to the notification including, for example, to alert Sam (e.g., by sending a message to Sam's phone), dismiss or remove the rule, or otherwise provide feedback to the home monitoring system 104. In the example of FIG. 5C, the user may determine, from viewing a live feed of the front door, that Sam does have his violin, and provide a correction to the notification "Sam does have his violin."

In some implementations, a notification may be provided to a user device associated with a different person than a person included in the rule in question. In the example of FIG. 5C, the home monitoring system 104 may provide a notification to Sam's mother that Sam has forgotten his violin, where Sam is the person included in the rule and Sam's mother is the different person receiving the notification. In the example of FIG. 5C, the rule evaluator 112 can receive the user feedback responsive to the provided notification (e.g., Sam's mother indicating that Sam has forgotten his violin) and use it to produce a secondary notification (e.g., notify Sam of his missing violin). For example, if the different person (e.g., Sam's mother) reviews the live video feed provided by the home monitoring system 104 and confirms that Sam has left the house without his violin, then a notification can be sent to Sam on Sam's mobile device that he has forgotten his violin.

Figure 5D:
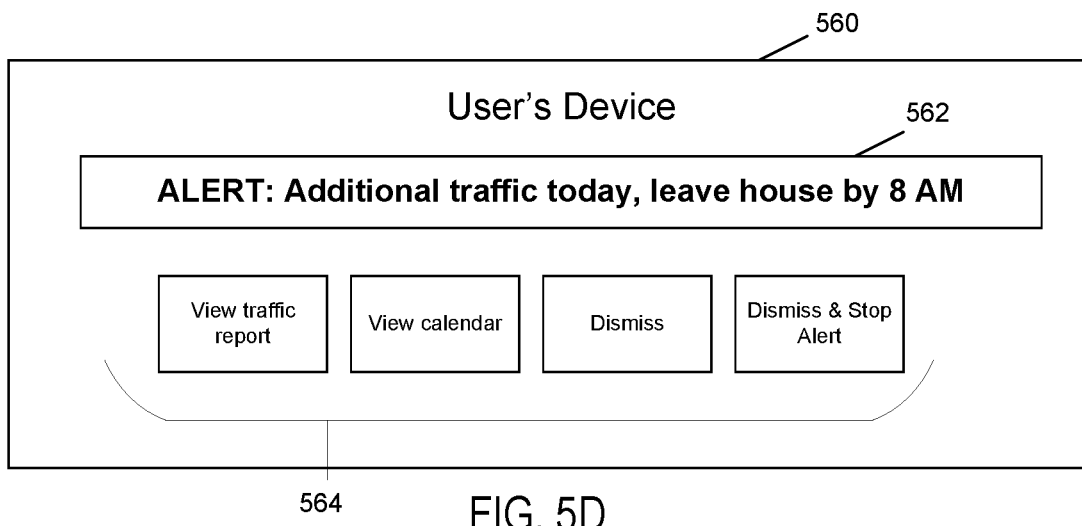

FIG. 5D is another example of a notification 560 provided to the user device 106a where the notification 560 represents a rule 562 (e.g., rule 118): "Additional traffic today, leave house by 8 AM." The user is presented with one or more options 564 responsive to the notification including, for example, to view a traffic report (e.g., through a $3^{rd}$ party website), view an upcoming calendar event, dismiss or remove the rule, or otherwise provide feedback to the home monitoring system 104. In the example of FIG. 5D, the user may determine that the alert is presented during a vacation and can dismiss or dismiss/stop the alert. The home monitoring system may receive feedback to dismiss and stop the alert as a signal to modify, cancel, or retrain the parameters of the rule 562.

Figure 5E:
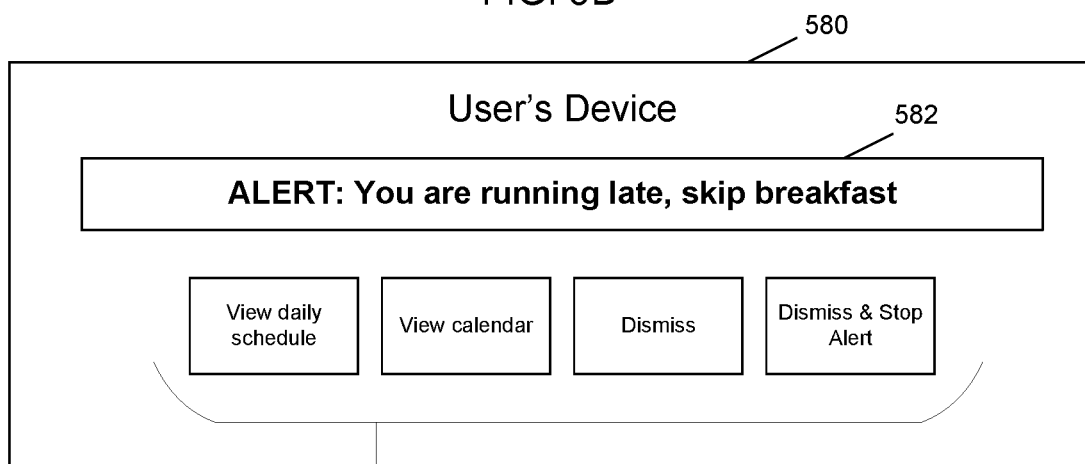

FIG. 5E is another example of a notification 580 provided to the user device 106a where the notification 580 represents a rule 582 (e.g., rule 118): "You are running late, skip breakfast." The user is presented with one or more options 584 responsive to the notification including, for example, to view a calendar or daily schedule, dismiss or remove the rule, or otherwise provide feedback to the home monitoring system 104.

User-feedback responsive to a notification generated for a rule 118 can be used to further train the site-specific object/human models 128 used by the rule evaluator 112 and home monitoring system 104. For example, a user providing user feedback including a label (e.g., a label for an object or person referenced in the rule) to the rule evaluator 112 responsive to a notification concerning the rule 118 can validate the determination by the home monitoring system 104 that the rule (e.g., defining an object/human) is unique and/or significant to the user. Additionally, it may establish semantic links between one or more objects and/or humans that may share the label (e.g., a name, type, and/or identity). This may be used by the home monitoring system 104 to validate assumptions (e.g., links between nodes of the knowledge graph). For example, a link between a human "Jane" and an object "Honda Accord" may be validated such that when the "Honda Accord" appears in a driveway within the home network, that "Jane" may be assumed present as well.

In some implementations, user feedback responsive to notifications including user-based labeling can be used to assign shared labels 120 to objects/humans in the site-specific models 128 that are determined, based on the user feedback, to be connected through a relationship. For example, a car that appears in the driveway whenever a person is detected in the area within the home network may be labeled such that both the car and the person share a label (e.g., "Jane" and "Jane's car").

User-defined labels 120 for objects/humans identified by the home monitoring system may be in turn used by the home monitoring system 104 when generating notifications to provide to the user on user device 106*a*. Utilizing user-defined labels 120 can make notifications responsive to rules more effective and/or recognizable to the user by providing a shared name for an object and/or cluster of features to the user. For example, a user-provided label "Jane's gym bag" is provided by the user for a recognized object, the home monitoring system may be able to provide more effective notifications related to "Jane's gym bag" in the future (e.g., associating the object with Jane's calendar events at the gym).

The home monitoring system 104 can interpret user interaction responsive to a notification of a rule to refine or remove a rule. For example, the home monitoring system 104 may interpret a positive interaction (e.g., the user did not ignore the notification) by the user with the notification and add a weighted value or significance (e.g., positive reinforcement) to the rule, and a negative/non-interaction (e.g., the user ignored the notification) by the user with the notification as a lower weighted value or significance (e.g., negative reinforcement). For example, "That's Jane's car" indicates that the user assigned value to the rule represented by the notification. In another example, a user ignoring a notification of a vehicle in the driveway may indicate that it is not a vehicle of interest (e.g., a delivery person or an infrequent visitor).

In some implementations, a user-provided feedback to a rule represented in the notification can be interpreted as a positive interaction (e.g., the user did not ignore the notification) by the user includes a correction from the user, indicating that the user finds the rule significant. The system may use the corrected information (e.g., corrected label) provided by the user responsive to the notification to refine the rule in question. For example, "That's not Jane's car, that's Joe's car," indicates the user's interest in the rule, and also indicates a correction in the labeling of the object represented by the rule. User provided feedback may include a statement that indicates user confusion, for example, "what car?" in which case the system may diminish or reduce the significance of the rule represented by the notification.

In some implementations, a user-provided feedback to a notification can be used to combine two or more rules. A user may indicate that an object (e.g., a car) identified by a rule is a same car as a previously defined car, such that the rule evaluator 112 may combine the rule in question and a previously established rule 118.

In some implementations, a user-provided feedback to a notification related to a rule can be used to generate new rules. A user may indicate that a particular object defined by the rule is related or associated with another object or person, thereby initiating another rule defining the new object or person. For example, a user feedback statement when presented with a rule defining a car, as "that's Jane's car" could initiate a second rule regarding a new person "Jane" and further establishing a relationship between the car and the person as a link between the nodes of "Jane's car" and "Jane" in the knowledge base.

In some implementations, a user's feedback responsive to a set of notifications (e.g., multiple instantiations of a rule over a period of time) can be aggregated to further refine or remove a rule. For example, a user may receive a notification (e.g., "You are running late in your morning routine") multiple times over a period of a week and snooze it for 5 minutes multiple times. The home monitoring system 104 may use the collected user feedback to determine that the user has a 5 minute leeway in the morning routine and incorporate the additional information into the rule.

In some implementations, other information can be interpreted from user-provided feedback to a notification. A user-provided feedback may give additional information concerning sub-classes for a site-specific human/object model 128, labels for a particular object/person defined in a rule, or relationships between one or more objects/humans defined in rules 118. For example, if the user provides feedback that "Jane's car" is a sedan, then the home monitoring system 104 may use this information to further classify the car, tag "Jane's car" to only transport five passengers, or other details. Other information provided in the user feedback can be used to alert the home monitoring system of an exception to a rule. For example, a user may state "Jane's car always parks in the driveway," such that if "Jane's car" is detected elsewhere, a notification may be generated responsive to the anomaly.

In some implementations, a user may provide clarification or additional information to the home monitoring system 104 without prompting from the system (e.g., without receiving a notification). User input may be provided, for example, through application 124 (e.g., home monitoring application 600 in FIG. 6) through an application interface 126 (e.g., system monitoring interface 602).

In another example, a user may see a van pulling into a driveway and provide clarification to the system "that's the cleaners parking" such that the home monitoring system may understand that "parking" refers to an arriving vehicle and label the van as the "cleaner's van."

Application Interface

Figure 6:
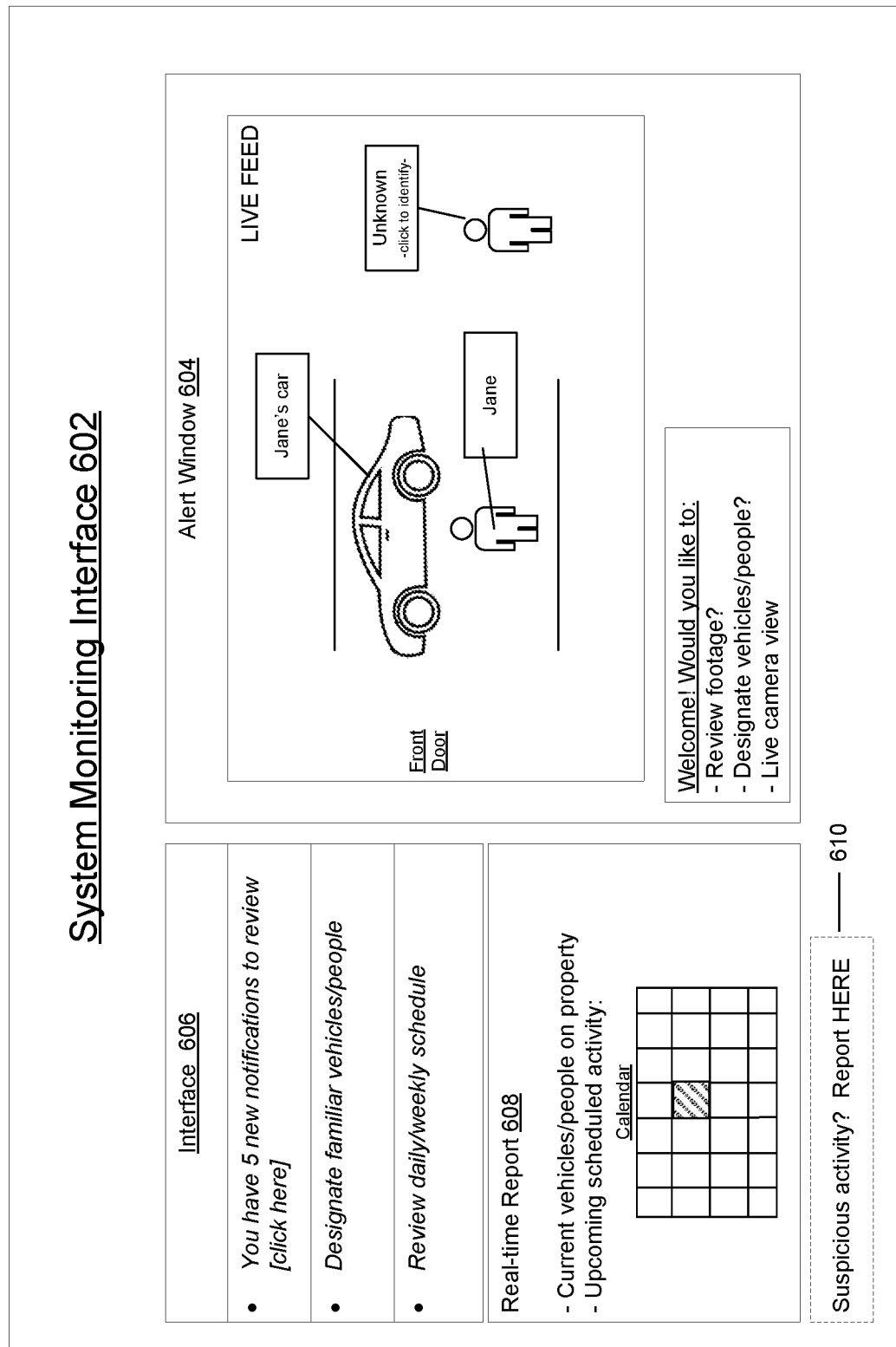
FIG. 6 is an example application interface for the home monitoring system.

FIG. 6 is an example application 600 for the home monitoring system (e.g., home monitoring system 104) including a system monitoring interface 602 through which one or more users may interact with the home monitoring system 104. System monitoring interface 602 can include, but is not limited to, an alert window 604, and one or more options for user interaction, depicted in FIG. 6 as interface tabs 606. Alert window 604 can include, for example, a live feed from one or more security cameras that may show a single or multiple combined camera view of areas of interest (e.g., a driveway, a front door, etc.). In some implementations, the alert window 504 may include identification (e.g., labels) for objects/humans identified in the alert window by the home monitoring system 104. For example, in the example depicted in FIG. 6, the alert window shows a car labeled as "Jane's car", a person labeled as "Jane," and a second, unidentified person. The user can identify (e.g., by assigning a label) the unidentified person using the system monitoring interface.

Interface tabs 606 can provide, but are not limited to, functionality that allow a user to review/provide feedback responsive to notifications (e.g., review rules generated by the rule evaluator), designate familiar vehicles/people (e.g., provide labels for site-specific object/human models), and review daily/weekly schedules (e.g., sync calendars, add/remove routines). In some implementations, a user may receive a set of notifications corresponding to one or more rules, for example, as a "daily summary" through the application 124, where the user can review and provide feedback responsive to the set of notifications.

In some implementations, a user can review rules including activity data 116 (e.g., video clips) through the system monitoring interface 602. Each rule available to be reviewed can include a short summary produced by the home monitoring system 104 to elucidate the rule. For example: "John entered through the front door", "An unknown truck stopped outside for 4 minutes", etc.). The user can provide statements (e.g., text or speech-to-text) clarifying or elaborating on the rules presented, for example "That's the delivery truck".

In some implementations, a user can review image and/or video data through the system monitoring interface 602 that include objects/humans that the home monitoring system 104 has determined may be of interest to the user. The user can manually apply labels to the objects/human. Objects/humans with user-applied labels can be used by the system analytics to train the home monitoring system 104 to recognize and further differentiate the objects/humans of interest.

In some implementations, a real-time report 608 including, for example, current vehicles/people at the property and upcoming scheduled activities can be presented through the system monitoring interface 602. One or more calendars (e.g., through a third-party client) can be synced with the application 600 to further refine rules 118 and notifications that are being generated and presented to the user.

In some implementations, a user may be able to report suspicious activity 610 through the system monitoring interface 602. For example, if a user identifies an unknown person in the alert window 604 and receives an unexpected notification from the home monitoring system 104, the user can alert relevant authorities (e.g., a security company, law enforcement, etc.)

In some implementations, a user may review activity data (e.g., activity data 116) through the system monitoring interface 602. For example, a user may review saved video footage from one or more cameras in the home network, motion-detectors, event-triggered recorded clips, or other data describing activity in the home network. The user may determine that the home monitoring system 102 failed to generate a notification for a rule violation (e.g., a false negative) in the reviewed activity data 116. The user can apply labels and/or specify that an alert should have generated but was not in order to further refine the home monitoring system 102.

Tracking Routines/People/Objects and Providing Notifications

In some embodiments, the home monitoring system can be utilized to learn one or more routines (e.g., a morning routine) of a person in the home and provide notifications to the person if an anomaly is detected in the person's routine. For example, a person may have a particular set of actions that they perform each morning before leaving the home at a particular time, e.g., wake up, eat breakfast, shower, brush teeth, pack a lunch, and walk out the door at 8:00 AM. In another example, a person may leave the home with a same particular object at a particular time of day. The home monitoring system can determine the actions included in the routine as well as a timing of each action in the routine and provide reminders/alerts to the person if the person deviates from the routine or is forgetting an object, e.g., is running late or has forgotten an object.

Figure 7:
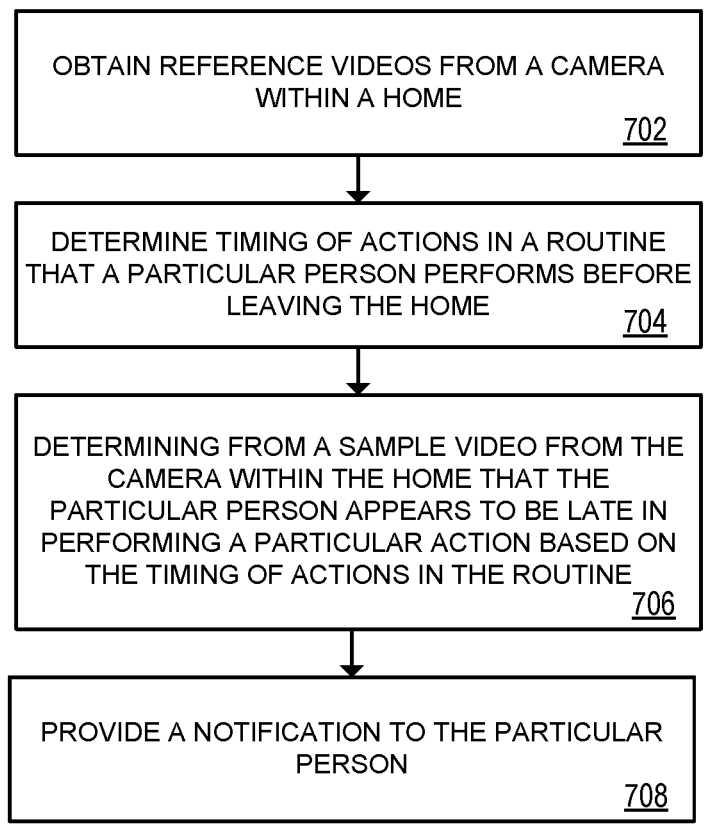
FIG. 7 is a flow diagram of another example process of the home monitoring system that provides notifications.

FIG. 7 is a process flow diagram of another example process 700 of the home monitoring system. Reference videos are obtained from a camera within a home including a home monitoring system (702). As described above with reference to FIG. 1, home surveillance devices 106*b* of the home network 102 can collect activity data 116, e.g., video data, from the home. In one example, reference video data for a particular camera can include a field of view of a front door of the home. Reference videos can be obtained from the particular camera of the front door of the home over a period of time, e.g., a two week period. A sequence of actions performed by the person is recorded in the reference videos captured by the camera. For example, reference videos can be captured of the person packing a bag, collected an umbrella, putting a phone in a pocket, and exiting the front door within the field of view of the camera.

In some implementations, video from multiple cameras each having a respective field of view in the home can be collected, such that a sequence of actions performed by the person is recorded in the reference videos. For example, reference videos can be collected by a camera located in a living room, a second camera located in a kitchen, and a third camera by a front door. Outdoor cameras can capture reference videos of outdoor scenes, e.g., cars entering/exiting a driveway, a user letting a dog outside, or the like.

A timing of actions in a routine that a particular person performs before leaving the home is determined (704). The timing of actions in a routine can include a time of the day (e.g., 8:15 AM, 3:00 PM, etc.) and a duration of time (e.g., an action takes 10 minutes to complete). Additionally, the timing of actions can include an order of operations for a set of actions, e.g., brush teeth then drinking coffee. Actions may be paired together (e.g., drink coffee and read the newspaper. Actions can be only performed in particular sequences, e.g., make coffee then drink coffee, or open front door then walk out front door. In one example, a set of actions includes i) drinking coffee, ii) packing a backpack, and iii) leaving from the front door, where the action "drinking coffee" is performed by the person between 8:15-8:25 AM, the action "packing a backpack" is performed by the person between 8:25-8:28 AM, and the action "leaving from the front door" is performed by the person between 8:28 AM-8:29 AM.

In some implementations, the timing of actions in a routine can include a range of timing and duration for each action, where a range can represent an average range of time and duration for the person to perform each action in a set of actions. For example, it can take the person between 15-45 minutes to exercise each morning with a start time that can range between 7:50 AM to 8:23 AM.

In some implementations, determining the timing of actions in the routine performed by the particular person before leaving the home includes performing cluster analysis on various instances of the actions within the reference videos. As described above with reference to FIG. 1, the pattern recognition module 110 can detect routines for human users from the collected activity data 116, e.g., reference videos. A routine may be detected by the pattern recognition model and determined to be significant such that one or more rules 118 are generated for the routine (e.g., a "Jane's morning routine"). Rules 118 can include the timing of actions, e.g., an order of actions performed by the person during the routine.

The routine performed by the particular person can include multiple sub-routines. Each sub-routine of the multiple sub-routines can include an associated time frame and duration during which the sub-routine is completed. In some implementations, each sub-routine can include a set of actions. In one example, each sub-routine is defined by actions performed by the person while in a particular room of the home, e.g., a bathroom sub-routine, a kitchen sub-routine, an entry-way sub-routine. Each sub-routine can be performed in a particular sequence or can be interchangeably performed during the routine.

In some implementations, determining timing of actions in the routine performed by the particular person before leaving the home includes determining a frequency of detected actions in the reference videos, a user-defined significance of actions in the reference videos, and a strength of a pattern of actions in the reference videos. Actions can be determined to be significant to a routine, e.g., exceed a threshold significance, based in part on a frequency that each action is performed over an observation period where reference videos are collected.

In some implementations, a user can define a routine including one or more sub-routines, where the user-defined routine includes prioritization of the one or more sub-routines. A user can provide information related to actions for a routine, e.g., a wake up time each morning by inputting a wake-up alarm, adding significance of the wake-up action observed in the reference videos.

Pattern analysis, as described in further detail with reference to FIG. 1, can be utilized to determine patterns of actions in the reference videos. For example, pattern recognition module 110 can determine that a user takes a gym bag when leaving the home every Monday, Wednesday, and Friday in the morning, observed in reference videos collected over a 2 week period.

In some implementations, the routine performed by the particular person includes a geo-path of the particular person through an area within the home. As described above with reference to FIG. 1, a geo-path can include point of entry into the area (e.g., a front door of a house) included within the home network 102, a point of exit out of the area included within the home network 102, as well as the path that the person/object travels along through an area within the home network 102. For example, a geo-path can include a path tracked from a front door, through a kitchen area, and to a bedroom of a house.

From a sample video from the camera within the home, a particular person is determined to be out of sync, e.g., be late, in performing a particular action based on the time of actions in the routine (706). Sample video data can be collected from the camera within the home, where the field of view of the camera includes an area of the home where one or more actions in the routine are expected to be observable, e.g., the camera captures a front door of the home. Sample video can be utilized to determine if a routine including a timing of actions performed by the user is being performed as expected, e.g., each action is performed within a threshold time frame.

In some implementations, one or more rules 118 can be defined based on the routine, where each rule defines a timing of an action performed by the person. For example, a rule can be a time and duration that a person is getting ready in the bathroom during a morning routine. The rule can include a range of times and duration, for example, person enters bathroom between 8:10-8:15 AM and exits the bathroom between 8:50-9:02 AM. A sample video from the camera can be collected and the system can determine that the person has not left the bathroom at 9:04 AM. In another example, a wake up rule can define that the person wakes up between 6:40-7:10 AM. A sample video from the camera can be collected and the system can determine that the person has not gotten out of bed at 7:25 AM.

A notification is provided to the particular person (708). The notification can include an alert to the particular person of the particular person's status relative to the routine. Notifications can be delivered to one or more devices and using one or more mediums (e.g., visual, audio, haptic) simultaneously or consecutively (e.g., as a detected anomaly or rule violation escalates). Devices or appliances can include but are not limited to: lights fixtures (e.g., a network-connected lamp), appliances (e.g., "smart" refrigerator), home electronics (e.g., television, coffeemaker), stereo systems, "smart" speakers, or other devices that include network connectivity and are connected to the home network 102. In some implementations, a notification can be an alert, e.g., a text/SMS, a pop-up window, or the like, to the person's mobile device. As described above with reference to FIG. 5E, the system may determine that the person is running late on the morning routine and provide a notification 580 to the person's mobile device including a suggestion to alter the routine in order to compensate, e.g., an alert "you are running late, skip breakfast."

In some implementations, as described with reference to FIG. 4 above, the notification includes a visual cue to the particular person of the particular person's status relative to the routine. A notification can include a change in lighting (e.g., flashing lights, changing color of lights, dimming lights, otherwise changing appearance) for one or more light fixtures in the house. For example, the home monitoring system 104 can generate a notification through the notification generator 114 including flashing one or more lights (e.g., at the front door) in the house. In another example, a notification to the person may include a changing of a lighting scheme (e.g., flashing light, changing color of light) of a lamp near the entrance to the home that will visually cue that the person has forgotten their phone.

In some implementations, generating the notifications includes determining a measure of the particular person's status relative to the routine. A measure of the person's status relative to the routine can be, for example, an amount of time that the person is running late on the routine, e.g., 15 minutes late to wake up, or an amount that a person performing a particular action is exceeding a threshold of time, e.g., is eating breakfast for 8 minutes longer than normal. A measure of the particular person's status can determine a type of notification, e.g., a severity of the notification, that is provided to the particular person. For example, a notification can include a gentle reminder "you may want to get your shoes on now" for a routine that is determined to be off schedule by 2 minutes versus a notification can include a serious reminder "leave now or you will be late!" for a routine that is determined to be off schedule by 20 minutes.

Figure 8:
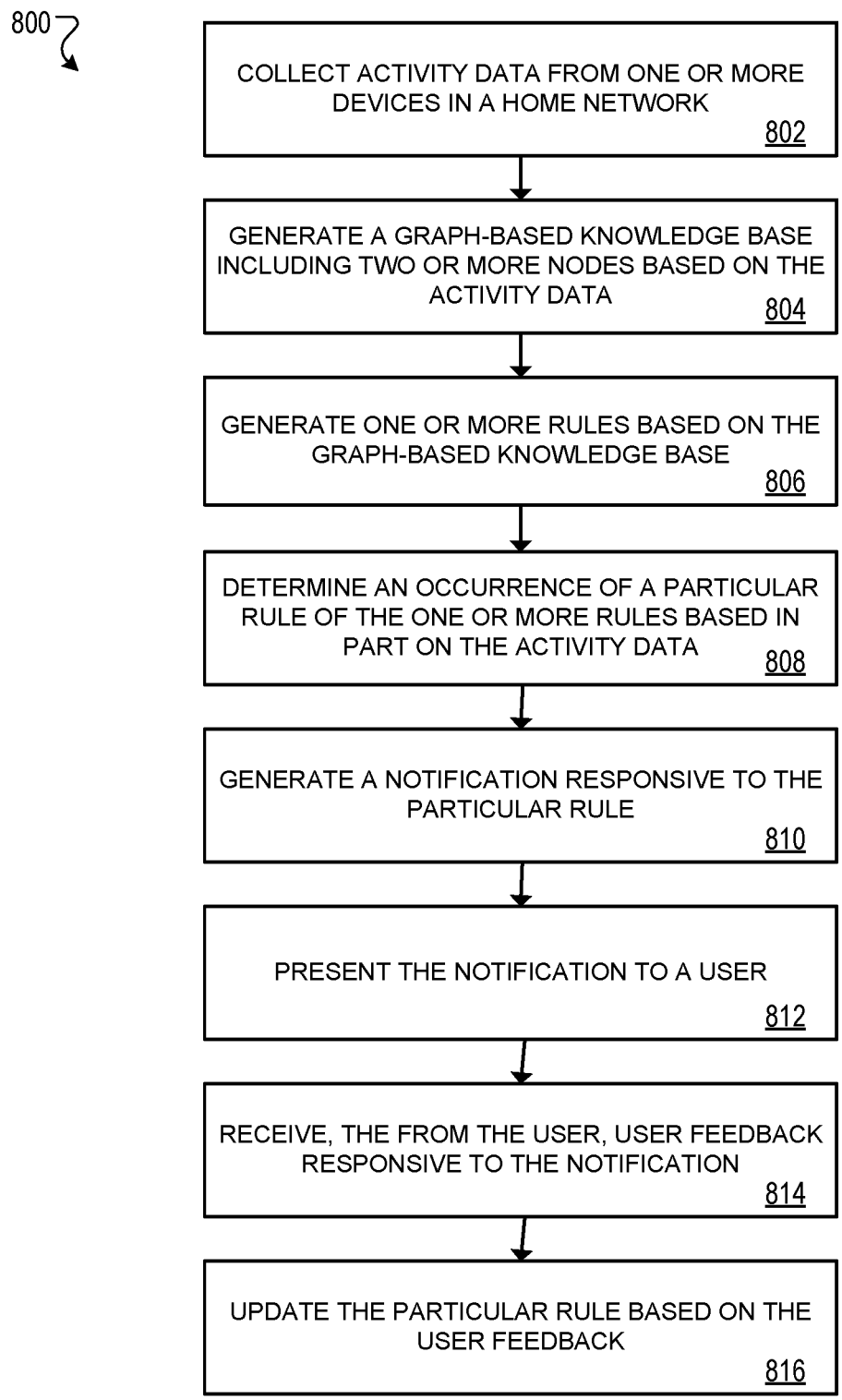
FIG. 8 is a flow diagram of an example process for using a graph-based knowledge base in a home monitoring system.

FIG. 8 is a flow diagram of an example process 800 for using a graph-based knowledge base in a home monitoring system. Activity data is collected from the one or more devices in a home network (802). As described above with reference to FIG. 1, the one or more devices can include user devices 106a, home surveillance devices 106b, and/or appliances 106c. Activity data 116 can include, for example, video data, geo-location data, or other data indicative of a person's actions within the home network 102. Activity data 116 can be collected during a period of time, e.g., 2 weeks, where the home monitoring system 104 collects the activity data in order to determine routines and patterns of the person.

A graph-based knowledge graph is generated including two or more nodes based on the activity data (804). Each node of the graph-based knowledge graph is an object, person, or routine and wherein each link is a relationship between two nodes. For example, two nodes are a person "Jane" and a mobile phone, where the link between Jane and the mobile phone establishes that the mobile phone belongs to Jane, e.g., Jane is observed with her mobile phone in the activity data.

In some implementations, the graph-based knowledge base includes one or more sub-graphs, where each sub-graph defines a relationship between at least two or more nodes. A first sub-graph can establish a first relationship between a first set of two nodes and a second sub-graph can establish a second, different relationship between a second, different set of two nodes. For example, a first sub-graph can establish "Jane leaves home with her mobile phone every weekday," where the nodes are Jane and mobile phone, and a second sub-graph can establish "Bob arrives home with his violin every Sunday," where the nodes are Bob and the violin. The two sub-graphs are each a part of the graph-based knowledge base for the home network 102, where the sub-graphs each define respective relationships between nodes that are observed in the activity data for the home network. In some implementations, a sub-graph can establish a temporal relationship between two nodes, e.g., a time when Jane leaves the home or Bob makes his coffee in the morning.

In some implementations, categories of objects or people and instances of events are represented as nodes and relationships between the categories and instances of events are represented as links between the nodes. In one example, a category of people can be "residents of the home". In another example, an event can be "morning routine" or "after-work routine" where each event is a node in the graph-based knowledge base. A relationship between the node "residents of the home" and "morning routine" can be established as "the morning routine for the residents of the home."

In some implementations, generating the graph-based knowledge base includes determining, based on the one or more site-specific models, two or more nodes, and determining, based on activity data, a relationship between the two or more nodes. Site-specific models, as described above in further detail, for example, with reference to FIG. 2A, can be trained for one or more of the objects, people, or events observed in the home network. Identifying significant nodes in the graph-based knowledge base can include utilizing site-specific models to analyze activity data collected from the home network, where the site-specific models can be used to detect statistically significant patterns in the activity data (e.g., to recognize Jane and Jane's mobile phone in the activity data as a significant pattern).

One or more rules are generated based on the graph-based knowledge base (806). A rule may be defined, for example, based on observations of established relationships in the graph-based knowledge base. In one example, a rule can be "Jane and Jane's phone exit the house together," where Jane and her phone are observed exiting the house together ten times over the course of ten days. The observation of "Jane and Jane's phone exit the house together" are reflected as a strong correlation in the graph-based knowledge base, where the sub-graph representing Jane, Jane's phone, the house, and the act of exiting the house is defined in the knowledge base.

In some implementations, a rule of the one or more rules is generated based on observations of a particular sub-graph of the one or more sub-graphs of the graph-based knowledge graph. Each of the one or more sub-graphs can each define a relationship between nodes observed in the activity data for the home network. Each of the sub-graphs can then be used to generate a rule defining an observed relationship, where a violation of the rule (e.g., Jane leaves the house without Jane's phone) will trigger a notification.

In some implementations, a user can provide a user-defined rule, where the user-defined rule includes one or more elements from the graph-based knowledge base. A user can provide user-provided attributes which can be assigned to each of the one or more nodes. Attributes can be natural-language descriptive terms that further define the nodes, and which can be used to identify particular nodes when providing notifications to the user. For example, an attribute can be a color, make, or model of a node that is a vehicle, e.g., "a green Honda Accord." In another example, an attribute can be a breed or name of a pet, e.g., "Sammy the dog" or "the Labradoodle dog."

An occurrence of a particular rule of the one or more rules is determined based in part on the activity data (808). An occurrence of a particular rule can be an observation in the activity data of the relationship of the two or more nodes defined by the rule, or an expected observation of the relationship of the two or more nodes defined by the rule. For example, a rule can define "Tommy leaving the house at 7:30 AM on weekdays," where Tommy may be observed in the activity data, e.g., surveillance video, leaving the home at 7:30 AM on a particular week day.

In some implementations, the rule can further define a negative occurrence, e.g., an observation of a violation of the relationship between the two or more nodes. For example, a rule defining Jane and Jane's mobile phone always leaving the house together can be observed in the activity data, e.g., in video data from a surveillance camera and/or positional data from Jane's mobile phone. An occurrence of Jane being observed in the activity data leaving the home without Jane's mobile phone can trigger an occurrence of the particular rule.

A notification responsive to the particular rule is generated (810). As described with reference to FIGS. 5A-5E above, the notification can be provided, for example, to a user's mobile phone via a pop-up window, through an application environment, or through text/SMS message. A notification can be a visual cue, e.g., changing a lighting scheme of one or more lights in the home, or another visual or audio-based notification through one or more appliances or systems in the home network. For example, if a notification responsive to the particular rule is meant to notify a user that they are running late on a morning routine, an alert can be provided through a smart speaker to notify the user that they should leave the home soon.

The notification can include information related to the particular rule, for example, details related to the violation of the rule. For example, for a particular rule related to a routine, the notification can include details of an amount that the user is running late. In another example, for a particular rule related to an object, the notification can include details related to a location of the object (e.g., "your violin is by the front door, don't forget it!").

The notification is presented to a user (812). One or more users can receive the generated notification. The user receiving the notification can include a user that is a node defined by the rule in question. For example, Jane may receive a notification related to a rule "Jane and Jane's mobile phone leave the house together." In some implementations, the user receiving the notification may be another interested party for the particular rule, e.g., a parent, caregiver, emergency worker, or the like. For example, Sam's mother may receive a notification related to a particular rule defining Sam's arrival at home after school.

User feedback is received from the user responsive to the notification (814). As described above, for example, with reference to FIG. 5B above, the user is presented with one or more options 524 responsive to the notification including, for example, to correct the label "Sam," dismiss or remove the rule, or otherwise provide feedback to the home monitoring system 104 (e.g., text or speech-to-text input). The user feedback can include a natural language label for the particular rule. A natural language label can be for example, an annotation or descriptive information for a particular rule, node, or link.

The particular rule is updated based on the user feedback (816). The natural language label can be applied to a particular node or link of the graph-based knowledge base. For example, a person-node in the graph-based knowledge base can be assigned a label "Mark" using a user-provided label "That's not Sam, that's Mark" responsive to alert 520.

In some implementations, the system can receive, from a user, a natural language graph-based query to the graph-based knowledge base, and determine, based on the one or more terms of the natural language graph based query, one or more nodes referenced by the query. The system can then provide to the user activity data related to the one or more nodes of the graph-based knowledge base. System queries are described in further detail below.

In some embodiments, the home monitoring system can be utilized to learn one or more relationships between people, objects, and events, and provide notifications to a user based on the observed relationships. The home monitoring system can determine the relationships between people, objects, and events through collecting activity data from the home network, and determine significant relationships to then track and provide notifications to users related to observations of the relationships.

Figure 9:
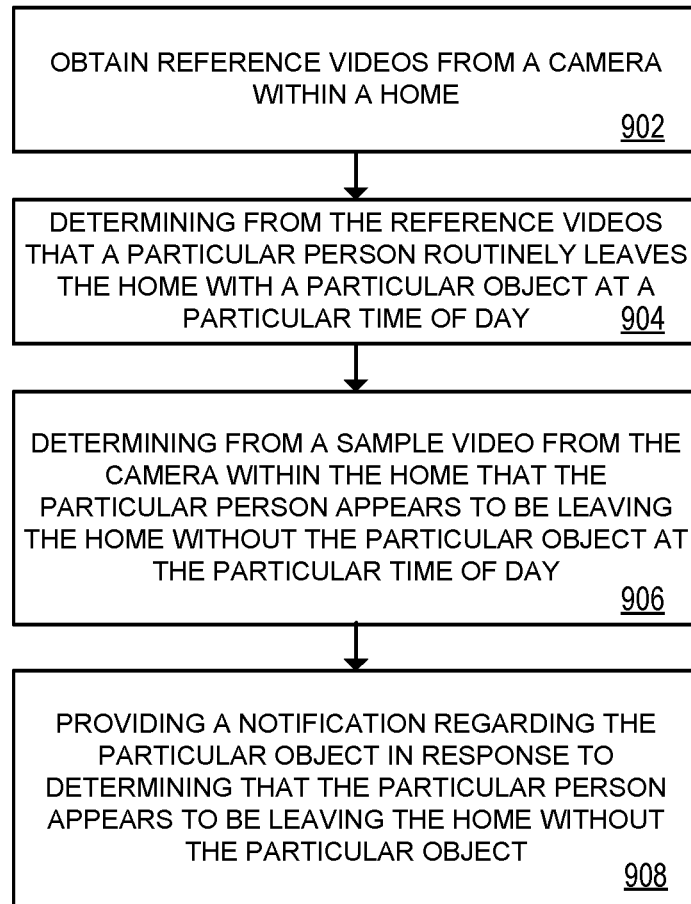
FIG. 9 is a flow diagram of another example process of the home monitoring system that provides notifications.

FIG. 9 is a flow diagram of another example process 900 of the home monitoring system to provide notifications. Reference videos are obtained from a camera within a home (902). As described above with reference to FIG. 1, home surveillance devices 106b of the home network 102 can collect activity data 116, e.g., video data, from the home. In one example, reference video data for a particular camera can include a field of view of a front door of the home. Reference videos can be obtained from the particular camera of the front door of the home over a period of time, e.g., a two week period. Actions performed by the person and objects associated with the person are recorded in the reference videos captured by the camera. For example, reference videos can be captured of the person carrying a backpack when entering/exiting the home, leaving the home with a violin on the weekdays, and putting a phone in a pocket within the field of view of the camera.

In some implementations, video from multiple cameras each having a respective field of view in the home can be collected, such that actions performed by the person and objects associated with the person are recorded in the reference videos. For example, reference videos can be collected by a camera located in a living room, a second camera located in a kitchen, and a third camera by a front door. Outdoor cameras can capture reference videos of outdoor scenes, e.g., cars entering/exiting a driveway, a user letting a dog outside, or the like.

In some implementations, the particular person can provide to the system user-provided activity data for a particular object. The user-provided activity data can include one or more of video data, image data, three-dimensional model data for the particular object. As described in further detail with reference to FIG. 1, a user may provide activity data 116 to the home monitoring system 104 instead of, or in addition to, waiting for the activity data collector 108 to gather sufficient activity data to recognize one or more patterns. A user may provide a 360° video of an item of interest, videos of a person with the item of interest entering/exiting the house, videos of the person without the item of interest entering/exiting the house, or other activity data that can replace or supplement the activity data 116 gathered by the home monitoring system 104. User-provided activity data 116 can be captured, for example, using one of the home surveillance devices 106b or a user device 106a, such that sufficient detail and various angles are captured for the home monitoring system 104 to process the item of interest. An application 124 (e.g., application 500 in FIG. 5) may include a functionality to guide a user in how to properly capture and upload the relevant activity data 116.

From the reference videos, the system determines that a particular person routinely leaves the home with a particular object at a particular time of day (904). As described with reference to FIG. 1, a pattern recognition module 110 can determine, based in part on the reference videos, relationships between objects, people, and events. For example, Jane can be observed in the reference videos leaving the home each morning with her mobile phone. The system can determine a pattern where Jane does not leave the home without her mobile phone in the mornings and define a relationship between Jane, her mobile phone, and the time of day.

The system determines from a sample video from the camera within the home that the particular person appears to be leaving the home without the particular object at the particular time of day (906). As described with reference to FIG. 4 above, the home monitoring system 404 collects sample video from a security camera 406b located near an entrance to the house. The home monitoring system 404 detects the user 408 leaving through the entrance to the house (e.g., at 9:15 AM) and evaluates rule "User's mobile phone leaves the house with User between 9-10 AM." Sample video generated by a security camera 406b (e.g., at the front door of the house) can be collected by the activity data collector 108, analyzed by the pattern recognition module 110, and evaluated against routine patterns that were previously determined in the reference videos. If the user is detected leaving the house (e.g., based on images from a security camera) without the user's mobile phone 406a, a violation is detected of the routine.

In some implementations, sample video can be collected from the camera within the home at a particular time associated with a routine action of the particular person. For example, if Jane routinely leaves the home at 7:40 AM, sample video from a camera having a field of view of the front door of the home may be collected for a period of time including the expected departure at 7:40 AM and analyzed to determine if the routine action is being performed by the particular person.

In some implementations, determining from the sample video from the camera within the home that the particular person appears to be leaving the home without the particular object at the particular time of day includes analyzing the sample video utilizing one or more site-specific models for the particular object and the particular person, e.g., a human model for the particular person and an object model for the particular object.

A notification is provided in response to determining that the particular person appears to be leaving the home without the particular object (908). A notification, as described above, for example, with reference to FIG. 4, can be a visual notification (e.g., changing of a lighting scheme of a lighting fixture in the home), an audio-based notification (e.g., through a smart speaker), a pop-up window on a mobile device or screen of a smart appliance, an alert through an application environment (e.g., application environment 600 in FIG. 6), or as a text/SMS message.

In some implementations, providing the notification regarding the particular object includes providing the notification to a user device of a user. As described, for example, with reference to FIG. 5C, a notification is provided to the user device 106a. The user is presented with information related to the observed anomaly in the sample video, e.g., that Sam is at the front door and does not have his violin. The user can be presented with one or more options 544 responsive to the notification including, for example, to alert Sam (e.g., by sending a message to Sam's phone), dismiss or remove the rule, or otherwise provide feedback to the home monitoring system 104.

In some implementations, the process can further include receiving from the user and responsive to the notification, user feedback including user-based labeling, where the user-based labeling includes one or more shared labels for the particular object. The one or more shared labels can define a relationship between two or more particular objects.

In some implementations, the process further includes receiving, from a user a natural language query referencing the particular object, the natural language query including one or more terms. In one example, a term can be a proper noun for a particular person (e.g., "Jane") or a descriptive term for an object (e.g., "green" for a backpack). The system can determine that objects appearing in reference videos are similar to a site-specific model of the particular object and provide to the user, a subset of reference videos including the particular object.

In some implementations, as described above with reference to FIG. 1, a site-specific human model is trained for the particular person using one or more of soft biometrics and facial recognition software analysis of the reference videos. Reference videos can be, for example, imaging data or imaging data with audio data.

System Queries

In some implementations, activity data 116 pertaining to objects and/or people in the home network 102 (e.g., entering/exiting the house within the home network) can be indexed for later queries. Queries may be input (e.g., text, speech-to-text) by a user on a user device through application interface 126 (e.g., system monitoring interface 502). A user can input a natural language graph-based query to the graph-based knowledge base (e.g., "who has left the house in Jane's Accord this week?" or "what is the latest anyone has gotten home this month?"). Natural language processing can be used to determine objects, people, or rules that the user may be trying to surface with the inputted query.

For example, if a user cannot find an item of interest (e.g., Joey's violin), a query to the home monitoring system 104 (e.g., through application 124) for "Joey's violin" initiates a search through stored activity data 116 for images where objects that may be "Joey's violin" (e.g., are similar to the site-specific model of Joey's violin) appear. The home monitoring system 104 may record and track items of interest within the area of the home network such that a query for an item may indicate a location, time, or other information at which the item was observed by the home monitoring system 104. In another example, a user may interact with a smart speaker (e.g., a home assistant) to query for a lost item (e.g., "Where are my glasses?")

In another example, a user may track a person of interest (e.g., a child arriving home after school) by issuing a query to the home monitoring system 104 (e.g., through application 124). The query initiates a search through stored activity data 116 for images of the person of interest, for example, using a site-specific human model for the person of interest. Tracking the person of interest can include information about the person's routines (e.g., how long it takes the person to get ready in the morning), or about the person's habits (e.g., "how many times did my son forget his violin this month").

In another example, a user may use the system queries to plan for future activities, for example, what activities need to completed prior to a departure on a trip (e.g., set lights, A/C, pet care, etc.). The user can query the system for information related to preparation for a trip, for example, "how long did it take us to get ready for the beach last time?"

In some implementations, a user may provide information related to an item of interest or a person of interest in order to have the ability to query for the information at a later time. For example, the user can provide a location of an item of interest (e.g., "tax documents are in the desk drawer") to the home monitoring system 104, in order to later have the ability to query for the location. In another example, the user may notify the home monitoring system of an arrival/departure from the home, (e.g., "I'm home") so that the user may later query for a time that they arrived home.

In some implementations, a user may query the home monitoring system for instances of rules 118, for example, when a particular rule 118 was determined to be executed. For example, a user may be interested in knowing when a rule including "house cleaning service van is parked in driveway" has last been detected by the home monitoring system 104. In another example, a user may be interested in knowing how often a rule is determined to be executed (e.g., how often a user has left for the gym in the morning) over a period of time.

In some implementations, a user-initiated query (e.g., for a person, object, or combination thereof) may cause the home monitoring system 104 to generate a rule based on the query. For example, a user can query for a particular routine (e.g., "How long does Sam take to get ready in the morning"). The home monitoring system 104 can determine from the user query that Sam's morning routine is important and generate a rule about Sam's morning routine. In another example, a user-initiated query for a new object (e.g., "Where are my new shoes?") can indicate to the home monitoring system 104 that the user is interested in tracking the new object.

In some implementations, a user may require additional authentication and/or permissions for one or more objects/humans/routines to be searchable (e.g., privacy settings). For example, a user may select to make expensive jewelry items, children, or other sensitive items/people searchable only to authorized users of the home monitoring system 104. A user may designate to be alerted if a search of a sensitive item/person by another user occurs, and further can allow the user to authorize another user to search for a sensitive item in the home monitoring system 104.

OTHER EMBODIMENTS

In some implementations, the system and methods described above with reference to the home monitoring system 104 can be applied to a commercial setting where a commercial monitoring system is employed. For example, in a small to medium-sized business setting, the commercial monitoring system can be used to make sure a designated employee is transporting proper items (e.g., cash deposit bag with a tracking chip) in and out of the business at a designated time. In another example, the commercial monitoring system can be used to track the movements of employees to monitor employee tasks and schedules.

In some implementations, the system and methods described above can be applied to monitoring the health and/or well-being of a resident of a home or care facility (e.g., an assisted living facility). For example, a wellness monitoring system can include sensors and devices to monitor the health and/or well-being of a resident of a home (e.g., an elderly person or a disabled person), through a well-being application in order to provide emergency help in cases of need. Various sensors and devices (e.g., video, audio, pressure sensors, passive infrared sensors, light switches, etc.) can be used to determine if a person is following a normal routine (e.g., a rule 118 including one or more activities). A normal routine can involve a wake up time (e.g., detected by a pressure sensor installed in a bed), a visit to a bathroom (e.g., detected by a light switch toggled on/off), a visit to a kitchen (e.g., network connected coffee maker), and leave the house (e.g., detected by video surveillance, mobile GPS). Deviations from the rule(s) 118 defining the routine (e.g., activities do not occur at expected times, activities occur out of order or not at all), can cause the home monitoring system to generate a series of escalating notifications responsive to the anomaly.

Escalating notifications (e.g., increasing in urgency and level of critical response) starting with, for example, a notification sent to the person's mobile device, followed by a notification sent to the person's trusted proxy/caregiver, and finally a call to emergency (e.g., 911) services can be generated if no response if received. In the example of the well-being application, a designated caregiver or trusted proxy contact can be provided with activity data 116 (e.g., live and recorded video, sensor data, etc.) to better determine the person's state. Privacy filters can be applied automatically to the activity data 116 provided to the trusted proxy in order to protect the person's privacy.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A home monitoring system comprising:
   one or more processors; and
   at least one computer-readable storage medium couple to the one or more processors having stored thereon instructions which, when executed by the one or more processors, cause the at least one processor to perform operations comprising:
   obtaining reference videos from a camera within a premises of a home;
   determining, from the reference videos, timing of each of a plurality of actions in a routine that a particular person performs before leaving the home;
   determining from a sample video from the camera within the home that the particular person appears to be out of sync in performing a particular action of the plurality of actions based on the respective timing of each of the plurality of actions in the routine determined from the reference videos; and
   in response to determining from the sample video from the camera within the home that the particular person appears to be out of sync in performing the particular action based on the respective timing of each of the plurality of actions in the routine determined from the reference videos, determining an adjustment to another action of the plurality of actions performed by the particular person in the routine; and
   providing a notification of the adjustment to the other action to the particular person.

2. The system of claim 1, wherein determining the timing of the plurality of actions in the routine performed by the particular person before leaving the home comprises performing cluster analysis on various instances of the actions within the reference videos.

3. The system of claim 1 wherein determining timing of the plurality of actions in the routine performed by the particular person before leaving the home comprises:
   determining a frequency of detected actions in the reference videos, a user-defined significance of the plurality of actions in the reference videos, and a strength of a pattern of the plurality of actions in the reference videos.

4. The system of claim 1, wherein the routine performed by the particular person comprises a geo-path of the particular person through an area within the home.

5. The system of claim 1, wherein the routine performed by the particular person comprises multiple sub-routines.

6. The system of claim 5, wherein each sub-routine of the multiple sub-routines includes an associated time frame and duration during which the sub-routine is completed.

7. The system of claim 1, further comprising:
receiving, from a user, a user-defined routine including one or more sub-routines, wherein the user-defined routine includes prioritization for the one or more sub-routines.

8. The system of claim 1, wherein the notification responsive to the particular person appearing to be out of sync in performing a particular action of the plurality of actions based on the timing of the plurality of actions in the routine comprises an alert to the particular person of the particular person's status relative to the routine.

9. The system of claim 8, wherein the notification comprises a visual cue to the particular person of the particular person's status relative to the routine.

10. The system of claim 9, wherein generating the notifications further comprises determining a measure of the particular person's status relative to the routine.

11. The system of claim 1, wherein the notification of the adjustment to the other action comprises reducing a length of time to perform the other action or cancelling the other action from the routine.

12. The system of claim 1, wherein determining the adjustment to the other action comprises:
determining, a prioritization of the plurality of actions; and
selecting the other action from the plurality of actions based on a prioritization of the other action relative to the plurality of actions.

13. A method comprising:
obtaining, by one or more processors, reference videos from a camera within a premises of a home;
determining, by the one or more processors and from the reference videos, timing of each of a plurality of actions in a routine that a particular person performs before leaving the home;
determining, by the one or more processors and from a sample video from the camera within the home, that the particular person appears to be out of sync in performing a particular action of the plurality of actions based on the timing of each of the plurality of actions in the routine determined from the reference videos; and
in response to determining from the sample video from the camera within the home that the particular person appears to be out of sync in performing the particular action based on the respective timing of each of the plurality of actions in the routine determined from the reference videos, determining an adjustment to another action of the plurality of actions performed by the particular person in the routine; and
providing a notification of the adjustment to the other action to the particular person.

14. The method of claim 13, wherein determining the timing of the plurality of actions in the routine performed by the particular person before leaving the home comprises performing cluster analysis on various instances of the actions within the reference videos.

15. The method of claim 13, wherein determining timing of the plurality of actions in the routine performed by the particular person before leaving the home comprises:
determining a frequency of detected actions in the reference videos, a user-defined significance of the plurality of actions in the reference videos, and a strength of a pattern of the plurality of actions in the reference videos.

16. The method of claim 13, wherein the routine performed by the particular person comprises a geo-path of the particular person through an area within the home.

17. The method of claim 13, wherein the routine performed by the particular person comprises multiple sub-routines.

18. The method of claim 17, wherein each sub-routine of the multiple sub-routines includes an associated time frame and duration during which the sub-routine is completed.

19. The method of claim 13, further comprising:
receiving, from a user, a user-defined routine including one or more sub-routines, wherein the user-defined routine includes prioritization for the one or more sub-routines.

20. The method of claim 13, wherein the notification responsive to the particular person appearing to be out of sync in performing a particular action of the plurality of actions based on the timing of the plurality of actions in the routine comprises an alert to the particular person of the particular person's status relative to the routine.

21. The method of claim 20, wherein the notification comprises a visual cue to the particular person of the particular person's status relative to the routine.

22. A non-transitory computer storage medium encoded with a computer program, the program comprising instructions that when executed by data processing apparatus cause the data processing apparatus to perform operations comprising:
obtaining reference videos from a camera within a premises of a home;
determining, from the reference videos, timing of each of a plurality of actions in a routine that a particular person performs before leaving the home;
determining from a sample video from the camera within the home that the particular person appears to be out of sync in performing a particular action of the plurality of actions based on the respective timing of each of the plurality of actions in the routine determined from the reference videos; and
in response to determining from the sample video from the camera within the home that the particular person appears to be out of sync in performing the particular action based on the respective timing of each of the plurality of actions in the routine determined from the reference videos, determining an adjustment to another action of the plurality of actions performed by the particular person in the routine; and
providing a notification of the adjustment to the other action to the particular person.

* * * * *